(12) United States Patent
Midorikawa et al.

(10) Patent No.: US 10,343,411 B2
(45) Date of Patent: Jul. 9, 2019

(54) LIQUID EJECTING HEAD AND LIQUID EJECTING RECORDING APPARATUS

(71) Applicant: SII Printek Inc., Chiba-shi, Chiba (JP)

(72) Inventors: Masaru Midorikawa, Chiba (JP); Naohiro Tomita, Chiba (JP); Shunsuke Yamazaki, Chiba (JP); Shuji Sato, Chiba (JP); Yuki Yamamura, Chiba (JP)

(73) Assignee: SII PRINTEK INC., Chiba (JP)

( * ) Notice: Subject to any disclaimer, the term of this patent is extended or adjusted under 35 U.S.C. 154(b) by 0 days.

(21) Appl. No.: 15/977,691

(22) Filed: May 11, 2018

(65) Prior Publication Data

US 2018/0333958 A1 Nov. 22, 2018

(30) Foreign Application Priority Data

May 19, 2017 (JP) .................................. 2017-099406
Nov. 9, 2017 (JP) .................................. 2017-216516

(51) Int. Cl.
*B41J 2/14* (2006.01)
*F16B 5/02* (2006.01)
(Continued)

(52) U.S. Cl.
CPC ......... *B41J 2/1752* (2013.01); *B41J 2/14201* (2013.01); *B41J 2/14209* (2013.01); *B41J 25/001* (2013.01); *B41J 25/34* (2013.01); *F16B 5/0233* (2013.01); *F16B 29/00* (2013.01); *B41J 2/1433* (2013.01); *B41J 25/003* (2013.01); *B41J 2002/14362* (2013.01); *B41J 2202/12* (2013.01);
(Continued)

(58) Field of Classification Search
CPC .. B41J 2/1752; B41J 2/14201; B41J 2/14209; B41J 2/1433; B41J 25/001; B41J 25/003; B41J 25/34; B41J 2002/14362; B41J 2002/12; B41J 2002/14; B41J 2002/19; B41J 2002/20; B41J 2/04505; B41J 25/304; B41J 2202/19; F16B 5/0233; F16B 29/00; F16B 13/066; F16B 13/0858
USPC ......................................................... 347/85
See application file for complete search history.

(56) References Cited

U.S. PATENT DOCUMENTS 6,151,051 A * 11/2000 Ikeda .................... B41J 2/14024
347/50
2003/0007041 A1* 1/2003 Hino ........................ B41J 2/175
347/85
(Continued)

FOREIGN PATENT DOCUMENTS

JP 2008-529830 A 8/2008

*Primary Examiner* — Huan H Tran
*Assistant Examiner* — Alexander D Shenderov
(74) *Attorney, Agent, or Firm* — Brinks Gilson & Lione

(57) ABSTRACT

A liquid ejecting head is mounted on a carriage in which a first positioning hole defined by a first inner surface is provided. The liquid ejecting head includes a first positioning member and a first intermediate member. The first intermediate member includes a first expansion portion being capable of being inserted into a first positioning hole and abutting on the first inner surface by expanding in a radial direction intersecting with an insertion direction of the first expansion portion. The first expansion portion includes a first insertion hole into which the first positioning member is inserted and expands in the radial direction by the first positioning member being inserted into the first insertion hole.

17 Claims, 27 Drawing Sheets

(51) Int. Cl.
*B41J 2/175* (2006.01)
*B41J 25/00* (2006.01)
*B41J 25/34* (2006.01)
*F16B 13/06* (2006.01)
*F16B 13/08* (2006.01)
*F16B 29/00* (2006.01)

(52) U.S. Cl.
CPC ........ *B41J 2202/14* (2013.01); *B41J 2202/19* (2013.01); *B41J 2202/20* (2013.01); *F16B 13/066* (2013.01); *F16B 13/0858* (2013.01)

(56) References Cited

U.S. PATENT DOCUMENTS

| | | | |
|---|---|---|---|
| 2005/0206714 A1* | 9/2005 | Greiser | B41J 2/1752 347/108 |
| 2008/0145130 A1 | 6/2008 | Marsden et al. | |
| 2010/0007699 A1* | 1/2010 | Watanabe | B41J 2/15 347/47 |
| 2011/0221822 A1* | 9/2011 | Hagiwara | B41J 2/14233 347/44 |
| 2013/0070021 A1* | 3/2013 | Nishimura | B41J 25/34 347/37 |

\* cited by examiner

LIQUID EJECTING HEAD AND LIQUID EJECTING RECORDING APPARATUS

RELATED APPLICATIONS

This application claims priority under 35 U.S.C. § 119 to Japanese Patent Application Nos. 2017-099406 filed May 19, 2017 and 2017-216516 filed Nov. 9, 2017, the entire content of which is hereby incorporated by reference.

BACKGROUND OF THE INVENTION

Field of the Invention

The disclosure relates to a liquid ejecting head and a liquid ejecting recording apparatus.

Background Art

As one of a liquid ejecting recording apparatus, an ink jet printer that records an image, characters, or the like by discharging (ejecting) an ink (liquid) to a recording medium such as a recording sheet is known. In this type of printer, recording of an image, characters, or the like is performed by supplying an ink from an ink tank to an ink jet head (liquid ejecting head) and discharging the ink from nozzles of the ink jet head to a recording medium.

The ink jet head is mounted on a carriage provided in the printer so as to be detachable and can be replaced as needed (for example, see JP-T-2008-529830).

SUMMARY OF THE INVENTION

In such a liquid ejecting recording apparatus, it is necessary that a recording operation is stably performed on a recording medium even in a case where the liquid ejecting head is replaced. Thus, it is desirable to provide a liquid ejecting head having high installation position accuracy in a carriage and a liquid ejecting recording apparatus including the same.

According to an embodiment of the disclosure, a liquid ejecting head is mounted on a carriage in which a first positioning hole defined by a first inner surface is provided. The liquid ejecting head includes a first positioning member and a first intermediate member. The first intermediate member includes a first expansion portion being capable of being inserted into the first positioning hole and abutting on the first inner surface by expanding in a radial direction intersecting with an insertion direction of the first expansion portion. The first expansion portion includes a first insertion hole into which the first positioning member is inserted and expands in the radial direction by the first positioning member being inserted into the first insertion hole.

According to the embodiment of the disclosure, a liquid ejecting recording apparatus includes the liquid ejecting head according to the embodiment of the disclosure, and a carriage in which the liquid ejecting head is mounted.

According to the liquid ejecting head and the liquid ejecting recording apparatus according to the embodiment of the disclosure, it is possible to stably perform a recording operation with high installation position accuracy in the carriage. As a result, it is possible to secure high reliability.

DETAILED DESCRIPTION OF THE INVENTION

Hereinafter, an embodiment of the disclosure will be described with reference to the drawings. Descriptions will be made in an order as follows.

1. Embodiment (example in which a base plate and a carriage are aligned by using one intermediate member and two positioning members)
2. Modification Examples Modification Example 1 (example in which a base plate and a carriage are aligned by using two positioning members and one intermediate member having expansion portions on both sides)

Modification Example 2 (example in which the base plate and the carriage are aligned by using one intermediate member and one positioning member)

Modification Example 3 (example including a mechanism that finely adjusts the intermediate member)

Modification Example 4 (example in which the base plate and the carriage are aligned by using an intermediate member being capable of being bidirectionally mounted on the carriage)

Modification Example 5 (example in which the base plate and the carriage are aligned by using two divided positioning members for one intermediate member)

Modification Example 6 (example in which the intermediate member and the base plate are integrated)

3. Other Modification Examples

1. EMBODIMENT

Overall Configuration of Printer 1

Figure 1:
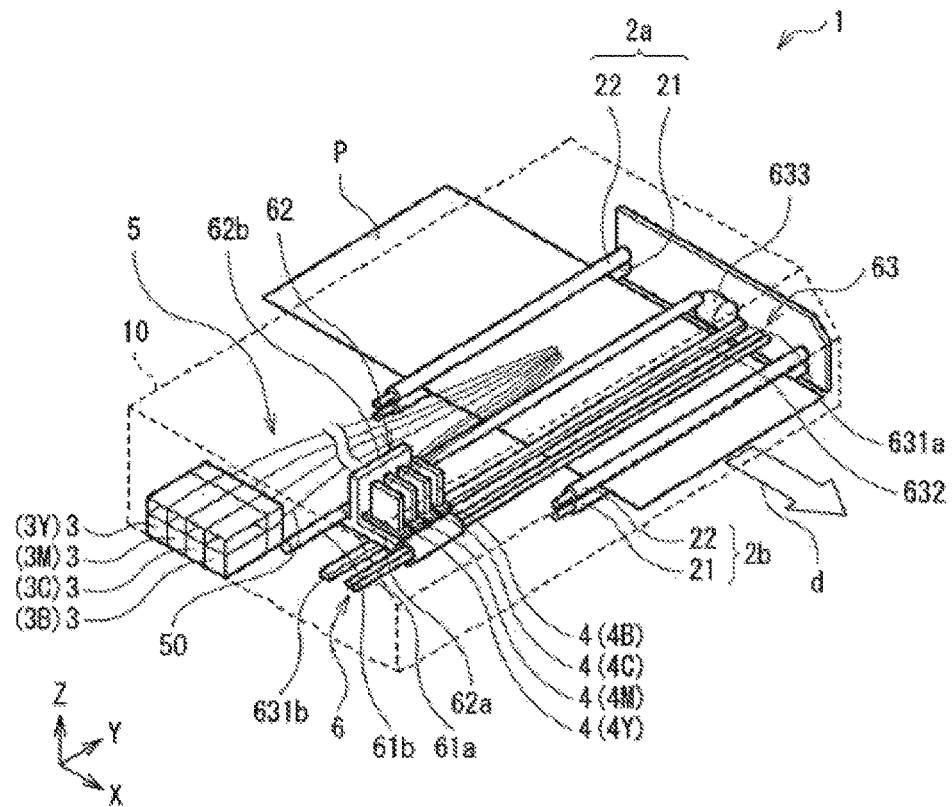
FIG. 1 is a perspective view schematically illustrating a configuration example of a liquid ejecting recording apparatus according to an embodiment of the disclosure.

FIG. 1 is a perspective view schematically illustrating a configuration example of a printer 1 as a liquid ejecting recording apparatus according to an embodiment of the disclosure. The printer 1 is an ink jet printer that records (prints) an image, characters, or the like on a recording sheet P as a recording medium by using an ink.

As illustrated in FIG. 1, the printer 1 includes a pair of transporting mechanisms 2a and 2b, an ink tank 3, an ink jet head 4, a circulation mechanism 5, and a scanning mechanism 6. The members are accommodated in a casing 10 having a predetermined shape. In the drawings used in descriptions in this specification, scales of the members are appropriately changed in order to illustrate the members to have a recognizable size.

Here, the printer 1 corresponds to a specific example of "the liquid ejecting recording apparatus" in the disclosure. The ink jet head 4 (ink jet heads 4Y, 4M, 4C, and 4B which will be described later) corresponds to a specific example of "the liquid ejecting head" in the disclosure.

As illustrated in FIG. 1, each of the transporting mechanisms 2a and 2b is a mechanism that transports a recording sheet P in a transport direction d (X-axis direction). Each of the transporting mechanisms 2a and 2b includes a grid roller 21, a pinch roller 22, and a driving mechanism (not illustrated). Each of the grid roller 21 and the pinch roller 22 is provided to extend in a Y-axis direction (width direction of recording sheet P). The driving mechanism is a mechanism that rotates the grid roller 21 around an axis (rotates in a Z-X plane). The driving mechanism is configured by a motor, for example.

Ink Tank 3

The ink tank 3 is a tank that accommodates an ink. As illustrated in FIG. 1 in this example, four kinds of tanks that respectively accommodate inks of four colors of yellow (Y), magenta (M), cyan (C), and black (B) are provided as the ink tank 3. That is, an ink tank 3Y that accommodates a yellow ink, an ink tank 3M that accommodates a magenta ink, an ink tank 3C that accommodates a cyan ink, and an ink tank 3B that accommodates a black ink are provided. The ink tanks 3Y, 3M, 3C, and 3B are arranged in the casing 10 in the X-axis direction.

The ink tanks 3Y, 3M, 3C, and 3B have the same configuration except for the color of an ink to be accommodated. Thus, descriptions will be made on the assumption that the ink tanks 3Y, 3M, 3C, and 3B are collectively referred to as the ink tank 3.

Ink Jet Head 4

The ink jet head 4 is a head that records an image, characters, or the like by ejecting (discharging) ink droplets to a recording sheet P from a plurality of nozzles H1 and H2 which will be described later. As illustrated in FIG. 1 in this example, four kinds of heads that respectively eject the inks of the four colors accommodated in the ink tanks 3Y, 3M, 3C, and 3B which are described above are provided as the ink jet head 4. That is, an ink jet head 4Y that ejects the yellow ink, an ink jet head 4M that ejects the magenta ink, an ink jet head 4C that ejects the cyan ink, and an ink jet head 4B that ejects the black ink are provided. The ink jet heads 4Y, 4M, 4C, and 4B are arranged in the casing 10 in the Y-axis direction.

The ink jet heads 4Y, 4M, 4C, and 4B have the same configuration except for the color of an ink to be used. Thus, descriptions will be made on the assumption that the ink jet heads 4Y, 4M, 4C, and 4B are collectively referred to as the ink jet head 4. The detailed configuration of the ink jet head 4 will be described later (see FIGS. 5 to 7).

Circulation Mechanism 5

The circulation mechanism 5 is a mechanism for circulating the ink between the ink tank 3 and the ink jet head 4. The circulation mechanism 5 includes a circulation flow passage 50 for supplying the ink from the ink tank 3 into the ink jet head 4. The detailed configuration of the circulation mechanism 5 will be described later (see FIG. 2).

Scanning Mechanism 6

The scanning mechanism 6 is a mechanism that causes the ink jet head 4 to perform scanning in the width direction of the recording sheet P (Y-axis direction). As illustrated in FIG. 1, the scanning mechanism 6 includes a pair of guide rails 61a and 61b extending in the Y-axis direction, a carriage 62 supported to be movable on the guide rails 61a and 61b, and a driving mechanism 63 moving the carriage 62 in the Y-axis direction. The driving mechanism 63 includes a pair of pulleys 631a and 631b disposed between the guide rails 61a and 61b, an endless belt 632 wound between the pulleys 631a and 631b, and a driving motor 633 driving the pulley 631a to rotate.

The pulleys 631a and 631b are disposed in areas corresponding to the vicinities of both ends of the guide rails 61a and 61b in the Y-axis direction, respectively. The carriage 62 is connected to the endless belt 632. The carriage 62 includes a pedestal 62a and a wall portion 62b. The pedestal 62a has a flat plate and the four kinds of ink jet heads 4Y, 4M, 4C, and 4B which are described above are placed on the pedestal 62a. The wall portion 62b vertically rises from the pedestal 62a (in a Z-axis direction). The ink jet heads 4Y, 4M, 4C, and 4B are placed on the pedestal 62a to be arranged in the Y-axis direction.

A moving mechanism that causes the ink jet head 4 and the recording sheet P to move relatively is configured by such a scanning mechanism 6 and the above-described transporting mechanisms 2a and 2b.

Circulation Mechanism 5

Figure 2:
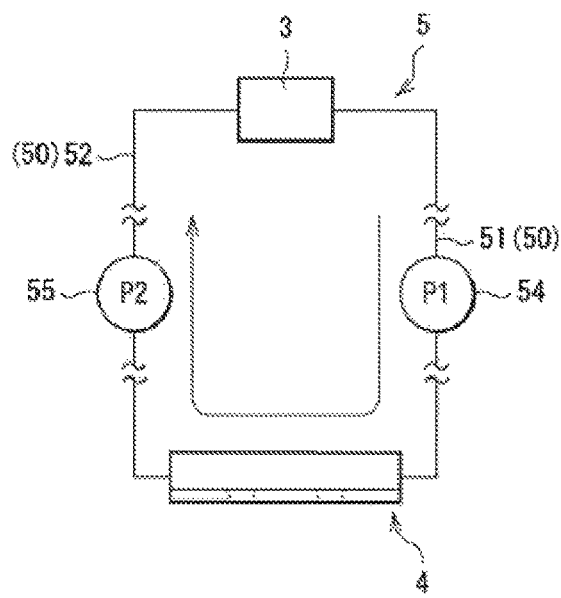
FIG. 2 is a diagram schematically illustrating a configuration example of a liquid ejecting head and a circulation mechanism illustrated in FIG. 1.

FIG. 2 is a diagram illustrating a schematic configuration example of the circulation mechanism 5. The circulation mechanism is a mechanism that circulates the ink between the ink tank 3 and the ink jet head 4. The circulation mechanism includes the circulation flow passage 50 including an ink supply tube 51 and an ink discharge tube 52, a pressurization pump 54 provided on the ink supply tube 51, and a suction pump 55 provided on the ink discharge tube 52. The ink supply tube 51 and the ink discharge tube 52 are made of, for example, a flexible hose having flexibility as much as can follow an operation of the scanning mechanism 6 that supports the ink jet head 4.

The pressurization pump 54 pressurizes the ink supply tube 51 so as to send the ink to the ink jet head 4 through the ink supply tube 51. The ink supply tube 51 between the pressurization pump 54 and the ink jet head 4 has positive pressure with respect to the ink jet head 4, by the function of the pressurization pump 54.

The suction pump 55 decompresses the ink discharge tube 52 so as to suck the ink from the ink jet head 4 through the ink discharge tube 52. The ink discharge tube 52 between the suction pump 55 and the ink jet head 4 has negative pressure with respect to the ink jet head 4, by the function of the suction pump 55. The ink can be circulated between the ink jet head 4 and the ink tank 3 through the circulation flow passage 50 by driving of the pressurization pump 54 and the suction pump 55.

Detailed Configuration of Ink Jet Head 4

Figure 3:
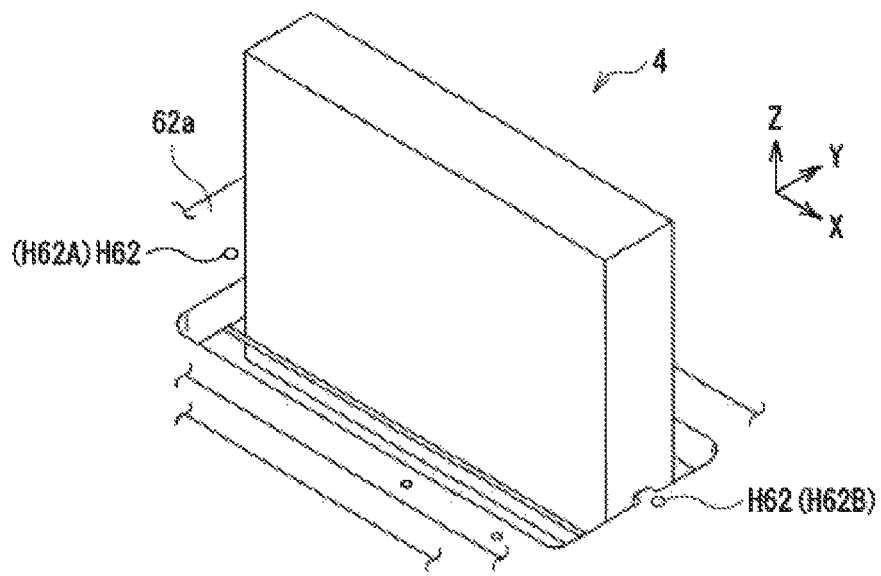
FIG. 3 is an enlarged perspective view illustrating the liquid ejecting head and the vicinity of the liquid ejecting head illustrated in FIG. 1.
Figure 4:
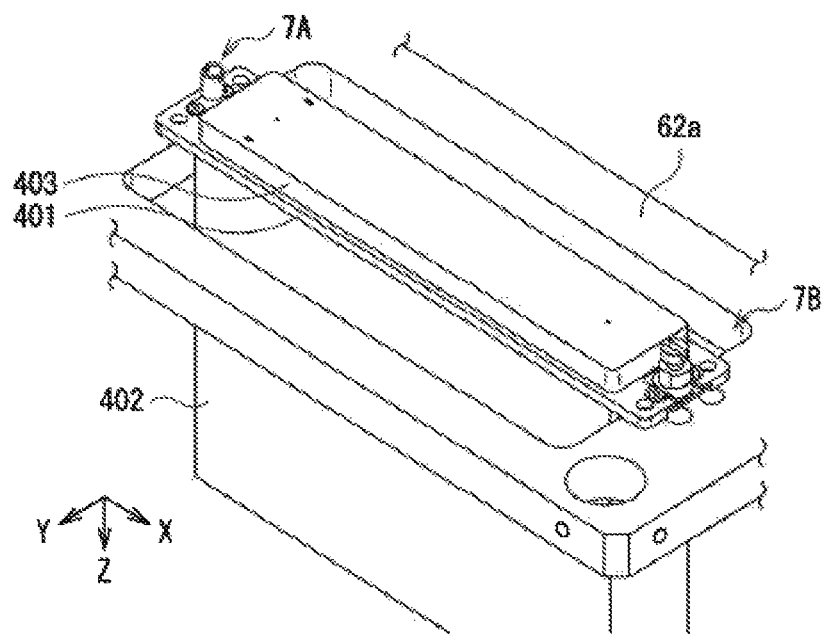
FIG. 4 is another enlarged perspective view illustrating the liquid ejecting head and the vicinity of the liquid ejecting head illustrated in FIG. 1.
Figure 5:
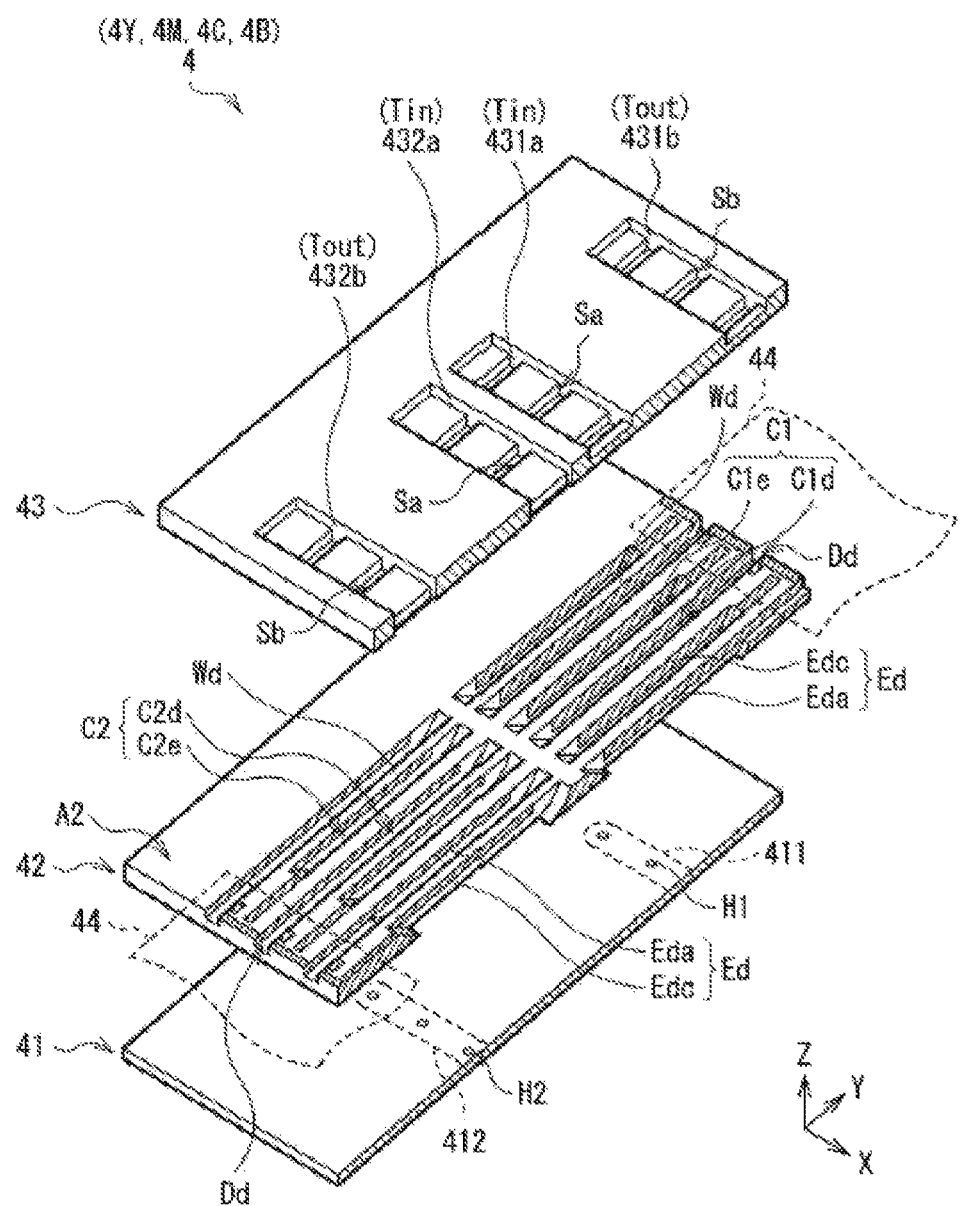
FIG. 5 is an exploded perspective view illustrating a head chip illustrated in FIG. 4.

Next, the detailed configuration example of the ink jet head 4 will be described with reference to FIG. 1 and FIGS. 3 to 10B. FIG. 3 is a perspective view illustrating an external appearance of the ink jet head 4 mounted on the pedestal 62a of the carriage 62 when obliquely viewed from the top. FIG. 4 is a perspective view illustrating the external appearance of the ink jet head 4 mounted on the pedestal 62a when obliquely viewed from the bottom. FIG. 5 is an exploded perspective view illustrating the detailed configuration example of a head chip 403 (which will be described later).

Figure 6:
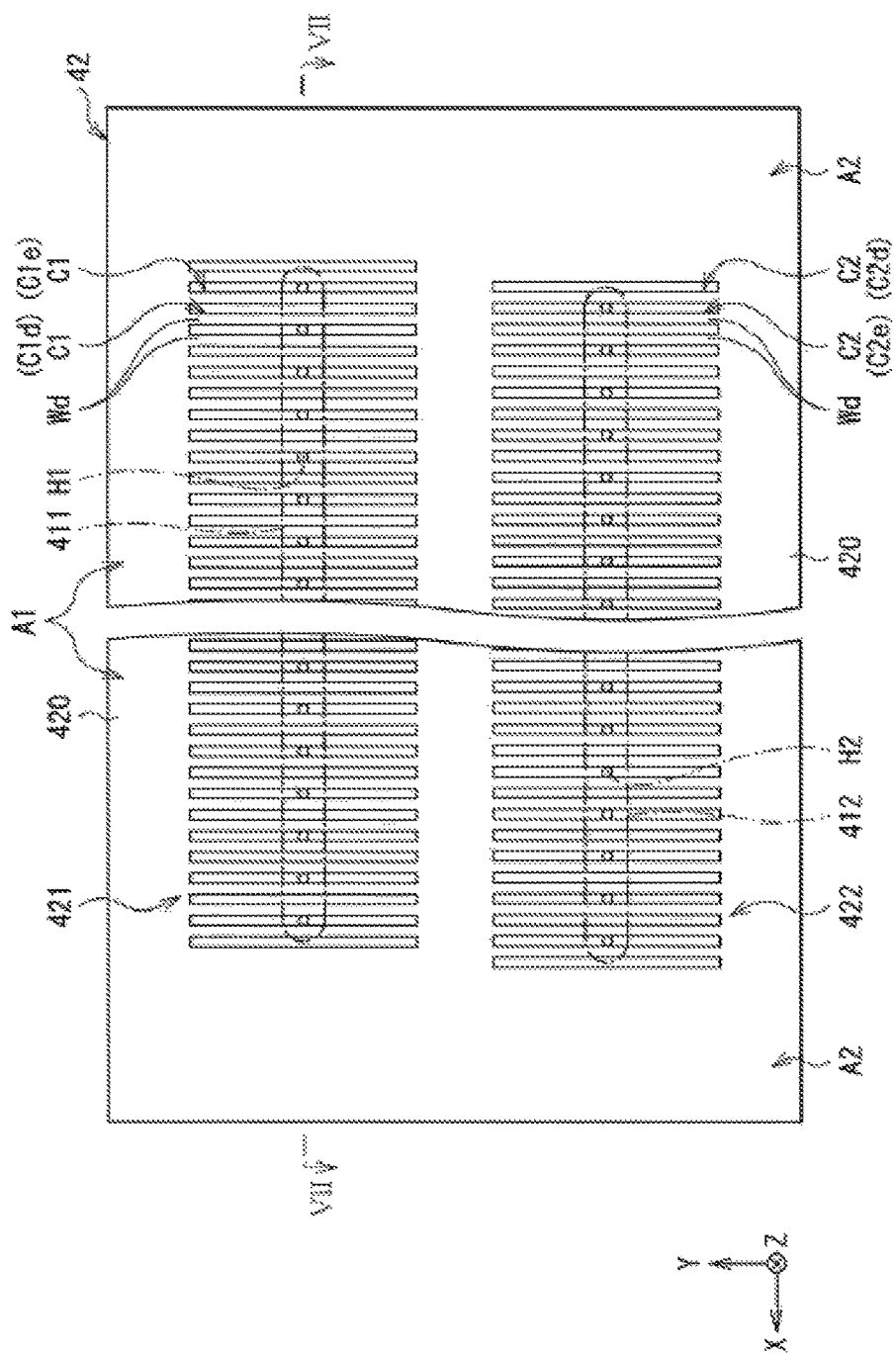
FIG. 6 is a bottom view illustrating the head chip illustrated in FIG. 4.
Figure 7:
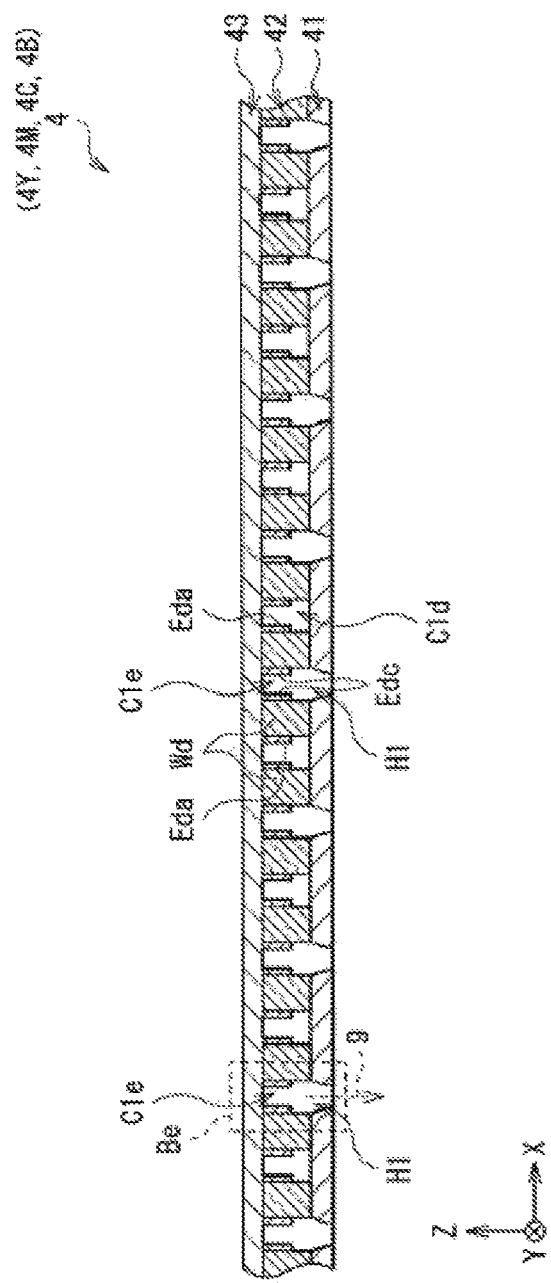
FIG. 7 is a sectional view illustrating the head chip illustrated in FIG. 4.

FIG. 6 is a bottom view (bottom view in an X-Y plane) schematically illustrating a configuration example of the head chip 403 in a state where a nozzle plate 41 (which will be described later) illustrated in FIG. 5 is detached. FIG. 7 is a sectional view schematically illustrating the configuration example (configuration example in a Z-X section) of the head chip 403 taken along line VII-VII illustrated in FIG. 6.

The ink jet head 4 in the embodiment is so-called a side shot type ink jet head in which an ink is discharged from center portions of a plurality of channels (channels C1 and C2) (which will be described later) in an extension direction (Y-axis direction). The ink jet head 4 is a circulation type ink jet head that the ink 9 is circulated between the ink jet head 4 and the ink tank 3 and is used by using the above-described circulation mechanism 5 (circulation flow passage 50).

As illustrated in FIGS. 3 and 4, the ink jet head 4 includes the base plate 401, a main body 402, and the head chip 403. The base plate 401 is a plate-like member mounted on the pedestal 62a by positioning mechanisms 7A and 7B. The main body 402 and the head chip 403 are mounted on the base plate 401 so as to interpose the base plate 401 between the main body 402 and the head chip 403. Details of the positioning mechanisms 7A and 7B will be described later.

The main body 402 includes a built-in controller. The controller controls various operations of the printer 1. For example, the controller controls a recording operation of an image, characters, or the like in the printer 1 (ejection operation of the ink in the ink jet head 4). Such a controller is configured, for example, by a microcomputer. The microcomputer includes an arithmetic processing unit and a storage unit configured by various memories.

As illustrated in FIG. 5, the head chip 403 includes the nozzle plate (ejection hole plate) 41, an actuator plate 42, and a cover plate 43 as the main components. The nozzle plate 41, the actuator plate 42, and the cover plate 43 are stuck to each other by using, for example, an adhesive, and are stacked in this order in the Z-axis direction. Descriptions will be made below on the assumption that the cover plate 43 side is referred to as an upper side and the nozzle plate 41 side is referred to as a lower side in the Z-axis direction.

Nozzle Plate 41

The nozzle plate 41 has a thickness of, for example, about 50 μm. The nozzle plate is made of a film material such as polyimide. As illustrated in FIG. 5, the nozzle plate is adhered to the lower surface of the actuator plate 42. As illustrated in FIGS. 5 and 6, two nozzle rows (nozzle rows 411 and 412) are provided in the nozzle plate 41. Each of the two nozzle rows extends in the X-axis direction. The nozzle rows 411 and 412 are disposed at a predetermined distance from each other in the Y-axis direction. As described above, the ink jet head 4 in the embodiment is a two-row type ink jet head.

The nozzle row 411 includes a plurality of nozzles H1 which are formed to be arranged on a straight line at a predetermined distance in the X-axis direction. Each of the nozzles H1 penetrates the nozzle plate 41 in a thickness direction of the nozzle plate (Z-axis direction). For example, as illustrated in FIG. 7, each of the nozzles H1 communicates with a discharge channel C1e in the actuator plate 42 (which will be described later). Specifically, as illustrated in FIG. 4, each of the nozzles H1 is formed to be positioned at the center portion of the discharge channel C1e in the Y-axis direction. A formation pitch between the nozzles H1 in the X-axis direction is equal to (the same pitch as) a formation pitch between discharge channels C1e in the X-axis direction. Although details will be described later, an ink supplied from the discharge channel C1e is discharged (ejected) from the nozzle H1 in such a nozzle row 411.

Similarly, the nozzle row 412 includes a plurality of nozzles H2 which are formed to be arranged on a straight line at a predetermined distance in the X-axis direction. Each of the nozzles H2 penetrates the nozzle plate 41 in the thickness direction of the nozzle plate and communicates with a discharge channel C2e in the actuator plate 42 (which will be described later). Specifically, as illustrated in FIG. 4, each of the nozzles H2 is formed to be positioned at the center portion of the discharge channel C2e in the Y-axis direction. A formation pitch between the nozzles H2 in the X-axis direction is equal to a formation pitch between discharge channels C2e in the X-axis direction. Although details will be described later, an ink supplied from the discharge channel C2e is discharged from the nozzle H2 in such a nozzle row 412. Each of the nozzles H1 and H2 is a tapered through-hole having a diameter which gradually decreases toward the lower side.

Actuator Plate 42

The actuator plate 42 is a plate made of, for example, a piezoelectric material such as PZT (lead titanate zirconate). In the actuator plate 42, a polarization direction is set to be one direction in the thickness direction (Z-axis direction). As illustrated in FIGS. 5 and 6, two channel columns (channel columns 421 and 422) are provided in the actuator plate 42. Each of the two channel columns extends in the X-axis direction. The channel columns 421 and 422 are disposed at a predetermined distance from each other in the Y-axis direction.

As illustrated in FIG. 6, a discharge area (ejection area) 1 of an ink is provided at the center portion (formation area of the channel columns 421 and 422) of such an actuator plate 42 in the X-axis direction. A non-discharge area (non-ejection area) A2 of an ink is provided at both end portions (non-formation area of the channel columns 421 and 422) of the actuator plate 42 in the X-axis direction. The non-discharge area A2 is positioned on an outside of the discharge area 1 in the X-axis direction. Each of both end portions of the actuator plate 42 in the Y-axis direction constitutes a tail portion 420.

As illustrated in FIGS. 5 and 6, the above-described channel column 421 includes a plurality of channels C1 which extend in the Y-axis direction. The channels C1 are disposed side by side, so as to be parallel to each other at a predetermined distance in the X-axis direction. Each of the channels C1 is formed by a drive wall Wd made of a piezoelectric body (actuator plate 42) and is a recessed groove portion in a sectional view (see FIG. 5).

Similarly, the channel column 422 includes a plurality of channels C2 which extends in the Y-axis direction. The channels C2 are disposed side by side, so as to be parallel to each other at a predetermined distance in the X-axis direction. Each of the channels C2 is also formed by the above-described drive wall Wd and is a recessed groove portion in a sectional view.

Here, as illustrated in FIGS. 5 and 6, a discharge channel C1e for discharging an ink and a dummy channel C1d that does not discharge an ink are provided as the channel C1. In the channel column 421, the discharge channel C1e and the dummy channel C1d are alternately disposed in the X-axis direction. The discharge channel C1e communicates with the corresponding nozzle H1 in the nozzle plate 41. The dummy channel C1d does not communicate with the corresponding nozzle H1 and is covered from the lower portion by the upper surface of the nozzle plate 41.

Similarly, a discharge channel C2e for discharging an ink and a dummy channel C2d that does not discharge an ink are provided as the channel C2. In the channel column 422, the discharge channel C2e and the dummy channel C2d are alternately disposed in the X-axis direction. The discharge channel C2e communicates with the corresponding nozzle H2 in the nozzle plate 41. The dummy channel C2d does not communicate with the corresponding nozzle H2 and is covered from the lower portion by the upper surface of the nozzle plate 41.

As illustrated in FIG. 6, the discharge channel C1e and the dummy channel C1d in the channel C1 are disposed to be far from the discharge channel C2e and the dummy channel C2d in the channel C2. Thus, in the ink jet head 4 in the embodiment, the discharge channel C1e in the channel C1 and the discharge channel C2e in the channel C2 are disposed in zigzag. As illustrated in FIG. 5, a shallow groove portion Dd is formed at portions of the actuator plate 42, which respectively correspond to the dummy channels C1d and C2d. Shallow groove portions communicate with outer end portions of the dummy channels C1d and C2d in the Y-axis direction, respectively.

Here, as illustrated in FIGS. 5 and 7, a drive electrode Ed extending in the Y-axis direction is provided on each of inner side surfaces of the above-described drive wall Wd, which face each other. A common electrode Edc and an active electrode Eda are provided as the drive electrode Ed. The common electrode Edc is provided on an inner side surface of each of the discharge channels C1e and C2e. The active electrode Eda is provided on an inner side surface of each of the dummy channels C1d and C2d. As illustrated in FIG. 7, such a drive electrode Ed (common electrode Edc and active electrode Eda) is formed only up to an intermediate position of the inner side surface of the drive wall Wd in a depth direction (Z-axis direction).

A pair of common electrodes Edc which face each other in the same discharge channel C1e (or discharge channel C2e) are electrically connected to each other at a common terminal (not illustrated). A pair of active electrodes Eda which face each other in the same dummy channel C1d (or dummy channel C2d) are electrically separated from each other. A pair of active electrodes Eda which face each other through the discharge channel C1e (or discharge channel C2e) are electrically connected to each other at an active terminal (not illustrated).

Here, as illustrated in FIG. 5, a flexible printed circuit board 44 is mounted on the above-described tail portion 420. The flexible printed circuit board 44 electrically connects the drive electrode Ed and the controller (controller 40 of the ink jet head 4, which will be described later). A wiring pattern (not illustrated) formed in the flexible printed circuit board 44 is electrically connected to the common terminal and the active terminal which are described above. Thus, a driving voltage is applied to each drive electrode Ed from the controller 40 (which will be described later) through the flexible printed circuit board 44.

Cover Plate 43

As illustrated in FIG. 5, the cover plate 43 is disposed to close the channels C1 and C2 (channel columns 421 and 422) in the actuator plate 42. Specifically, the cover plate 43 is adhered to the upper surface of the actuator plate 42 and has a plate-like structure.

As illustrated in FIG. 5, a pair of inlet-side common ink rooms 431a and 432a and a pair of outlet-side common ink rooms 431b and 432b are formed in the cover plate 43. Specifically, each of the inlet-side common ink room 431a and the outlet-side common ink room 431b is formed in an area of the actuator plate 42, which corresponds to the channel column 421 (plurality of channels C1). Each of the inlet-side common ink room 432a and the outlet-side common ink room 432b is formed in an area of the actuator plate 42, which corresponds to the channel column 422 (plurality of channels C2).

The inlet-side common ink room 431a is formed in the vicinity of an inner-side end portion of each of the channels C1 in the Y-axis direction. The inlet-side common ink room 431a is a recessed groove portion. A supply slit Sa which penetrates the cover plate 43 in a thickness direction of the cover plate (Z-axis direction) is formed in an area of the inlet-side common ink room 431a, which corresponds to each of the discharge channels Cle. Similarly, the inlet-side common ink room 432a is formed in the vicinity of an inner-side end portion of each of the channels C2 in the Y-axis direction. The inlet-side common ink room 432a is a recessed groove portion. The supply slit Sa is also formed in an area of the inlet-side common ink room 432a, which corresponds to each of the discharge channels C2e.

Each of the inlet-side common ink rooms 431a and 432a is a portion constituting an inlet portion Tin in the ink jet head 4.

As illustrated in FIG. 5, the outlet-side common ink room 431b is formed in the vicinity of an outer-side end portion of each of the channels C1 in the Y-axis direction. The outlet-side common ink room 431b is a recessed groove portion. A discharge slit Sb which penetrates the cover plate 43 in the thickness direction of the cover plate is formed in an area of the outlet-side common ink room 431b, which corresponds to each of the discharge channels Cle. Similarly, the outlet-side common ink room 432b is formed in the vicinity of an outer-side end portion of each of the channels C2 in the Y-axis direction. The outlet-side common ink room 432b is a recessed groove portion. The discharge slit Sb is also formed in an area of the outlet-side common ink room 432b, which corresponds to each of the discharge channels C2e.

Each of the outlet-side common ink rooms 431b and 432b is a portion constituting an outlet portion Tout in the ink jet head 4.

As described above, the inlet-side common ink room 431a and the outlet-side common ink room 431b communicate with the discharge channels C1e through the supply slit Sa and the discharge slit Sb, respectively. However, the inlet-side common ink room and the outlet-side common ink room do not communicate with the dummy channels C1d. That is, each of the dummy channels C1d is closed by the bottom portions of the inlet-side common ink room 431a and the outlet-side common ink room 431b.

Similarly, the inlet-side common ink room 432a and the outlet-side common ink room 432b communicate with the discharge channels C2e through the supply slit Sa and the discharge slit Sb, respectively. However, the inlet-side common ink room and the outlet-side common ink room do not communicate with the dummy channels C2d. That is, each of the dummy channels C2d is closed by the bottom portions of the inlet-side common ink room 432a and the outlet-side common ink room 432b.

Positioning Mechanism 7A

Figure 8:
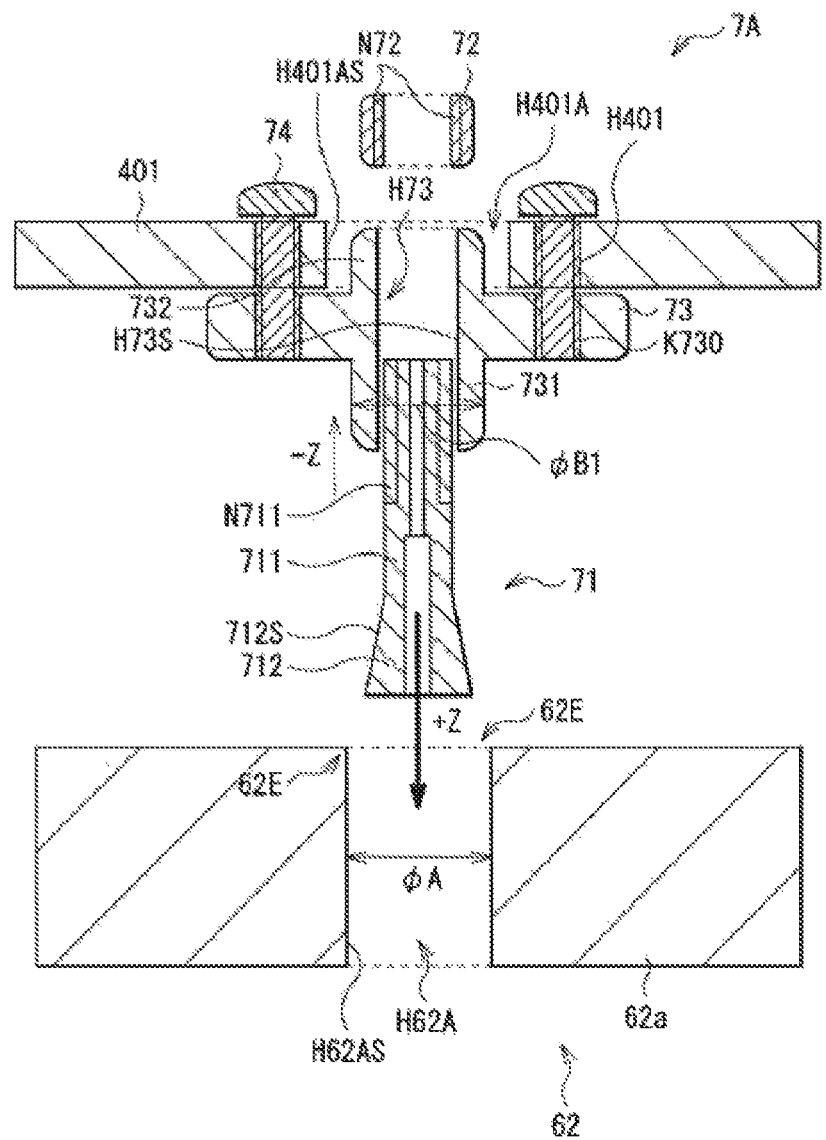
FIG. 8 is an enlarged sectional view illustrating a positioning mechanism in a state before the liquid ejecting head illustrated in FIG. 1 is mounted on a carriage.
Figure 9:
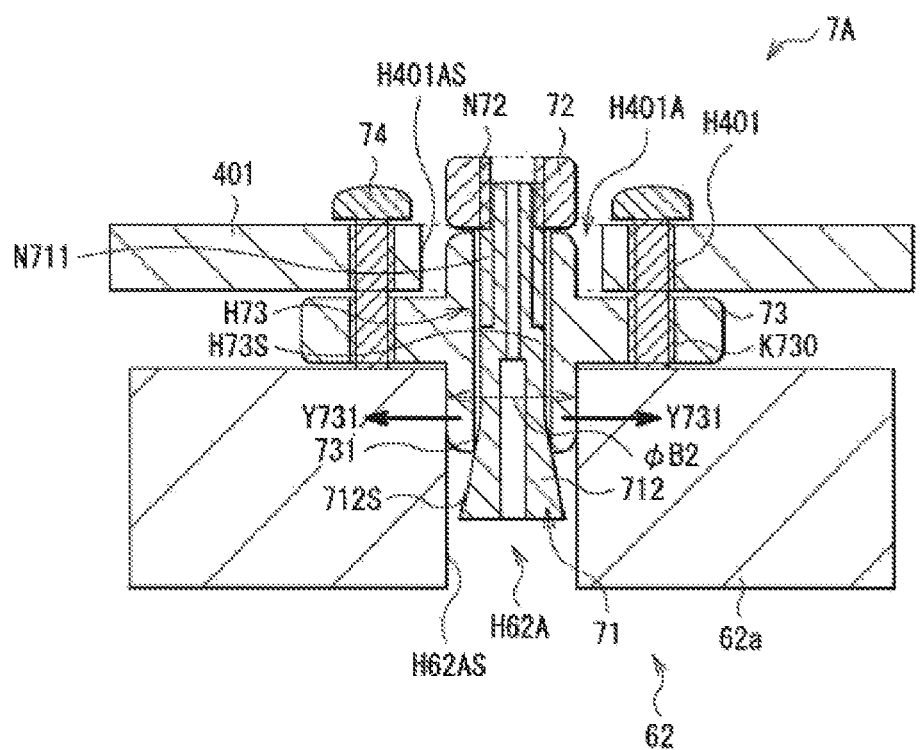
FIG. 9 is an enlarged sectional view illustrating the positioning mechanism in a state where the liquid ejecting head illustrated in FIG. 1 is mounted on a carriage.
Figure 10A:
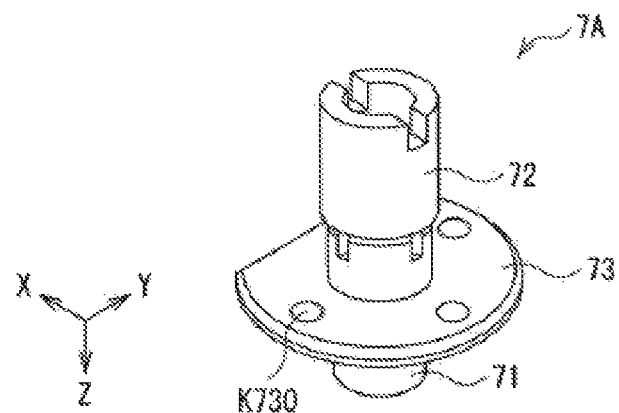
FIG. 10A is an enlarged perspective view illustrating the positioning mechanism illustrated in FIG. 4.
Figure 10B:
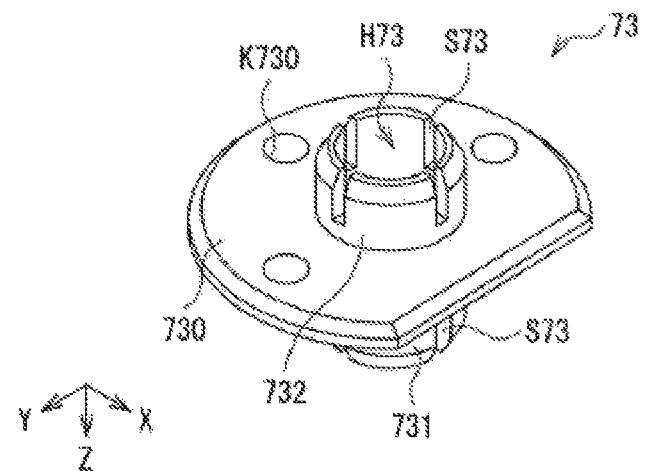
FIG. 10B is an enlarged perspective view illustrating a portion of the positioning mechanism illustrated in FIG. 10A.

Next, a configuration of the positioning mechanism 7A will be described in detail with reference to FIGS. 8 to 10B. FIG. 8 is an enlarged sectional view schematically illustrating the positioning mechanism 7A and the vicinity thereof in a state before the ink jet head 4 (base plate 401) is mounted on the pedestal 62a of the carriage 62. FIG. 9 is an enlarged sectional view schematically illustrating the positioning mechanism 7A and the vicinity thereof in a state where the ink jet head 4 (base plate 401) is mounted on the pedestal 62a of the carriage 62. FIG. 10A is a perspective view illustrating an external appearance of the positioning mechanism 7A. FIG. 10B is a perspective view illustrating an external appearance of an intermediate member 73 in the positioning mechanism 7A.

As illustrated in FIGS. 8 to 10A, the positioning mechanism 7A includes positioning members 71 and 72 and the intermediate member 73. As illustrated in FIG. 10B, the intermediate member 73 includes a base portion 730 having a flat-plate shape, a protrusion portion 731, and a protrusion portion 732. The protrusion portions 731 and 732 are provided to stand on both surfaces of the base portion 730. The intermediate member 73 may be made of, for example, a material which is elastically deformed easier than that of the base plate 401 or the carriage 62. A plurality of slits S73 extending in a protrusion direction of the protrusion portions (Z-axis direction) may be provided in the protrusion portion 731 and the protrusion portion 732. A hole H73 penetrating the protrusion portion 731, the base portion 730, and the protrusion portion 732 is provided in the intermediate member 73. The hole H73 of the intermediate member 73 includes a columnar inner surface H73S, for example. A plurality (three in an example of FIGS. 8 to 10B) of screw holes K730 is provided in the base portion 730 of the intermediate member 73. Here, the positioning members 71 and 72 are specific examples corresponding to "a first positioning member" and "a second positioning member" of the disclosure, respectively. The intermediate member 73 is a specific example corresponding to "a first intermediate member" of the disclosure. The protrusion portion 731 is a specific example corresponding to "a first expansion portion" of the disclosure. The hole H73 of the intermediate member 73 is a specific example corresponding to "a first insertion hole" of the disclosure.

A hole H401 penetrating the base plate 401 in the Z-axis direction is provided at a position in the base plate 401, which corresponds to each of the screw holes K730 of the intermediate member 73 in the Z-axis direction. That is, a portion of the base portion 730 overlaps a portion of the base plate 401 so as to cause the screw hole K730 of the base portion 730 in the intermediate member 73 to communicate with the hole H401 of the base plate 401 in the Z-axis direction. A screw 74 passes through the hole H401 and screws into the screw hole K730. Thus, the base plate 401 and the base portion 730 of the intermediate member 73 are fastened to each other.

A hole H62A into which the protrusion portion 731 is inserted is provided in the pedestal 62a of the carriage 62. A hole H401A is provided at a position in the base plate 401, which corresponds to the hole H62A in the Z-axis direction. The hole H62A in the pedestal 62a of the carriage 62 has an inner surface H62AS. Here, the hole H62A in the pedestal 62a of the carriage 62 is a specific example corresponding to "a first positioning hole" of the disclosure. The inner surface H62AS of the hole H62A is a specific example corresponding to "a first inner surface" of the disclosure.

If the positioning member 71 is inserted into the hole H73, the protrusion portion 731 of the intermediate member 73 deforms (for example, elastically deforms) to expand in a radial direction Y731 (see FIG. 9) intersecting with an insertion direction of the positioning member (+Z direction). The protrusion portion 731 inserted into the hole H62A in the pedestal 62a of the carriage 62 deforms in this manner and thus can abut on the inner surface H62AS of the hole H62A in the pedestal 62a of the carriage 62.

As illustrated in FIGS. 8 and 9, the positioning member 71 includes a shaft portion 711 and a tapered portion 712. The shaft portion 711 includes screw threads N711 formed on an outer circumferential surface and extends in the Z-axis direction. The tapered portion 712 has dimensions in the radial direction Y731 (see FIG. 9), which increase as becoming farther from the shaft portion 711 in the Z-axis direction. Thus, the dimensions of the protrusion portion 731 in the radial direction Y731 increase with the positioning member 71 moving for the intermediate member 73 in a −Z direction.

The positioning member 72 is provided to be capable of screwing to the positioning member 71. Specifically, the positioning member 72 is a nut-like member having an annular external appearance, in which screw threads N72 are formed on an inner surface. The shaft portion 711 of the positioning member 71 is inserted by the screw thread N72 screwing to the screw thread N711. If the positioning member 71 rotates, for example, rightward with respect to the positioning member 72, the positioning member 71 and the positioning member 72 can become close to each other in the Z-axis direction. However, the protrusion portion 732 of the intermediate member 73 abuts on the positioning member 72. Therefore, if the positioning member 71 moves to approach the positioning member 72, the shaft portion 711 of the positioning member 71 deeply enters into the hole H73 of the intermediate member 73 from the protrusion portion 731 side. At this time, a tapered surface 712S of the tapered portion 712 of the positioning member 71 presses the inner surface H73S of a tip end portion of the protrusion portion 731 in the intermediate member 73 in the radial direction Y731, and thus the inner surface H73S expands. The protrusion portion 731 which has deformed to expand in the radial direction Y731 can abut on the inner surface H62AS of the hole H62A in the pedestal 62a of the carriage 62. Thus, it is noted that FIG. 8 illustrates a situation when the protrusion portion 731 contracts. This situation corresponds to a stage before the protrusion portion 731 of the intermediate member 73 expands in the radial direction Y731. It is noted that FIG. 9 illustrates a situation when the protrusion portion 731 expands. This situation corresponds to a stage after the protrusion portion 731 of the intermediate member 73 expands in the radial direction Y731.

Here, in the embodiment, satisfying Conditional Expression (1) is desired.

$$\phi B1 < \phi A \leq \phi B2 \quad (1)$$

φA indicates the inner diameter of the hole H62A in the pedestal 62a of the carriage 62. φB1 indicates the outer diameter of the contracted protrusion portion 731 of the intermediate member 73. φB2 indicates the outer diameter of the expanded protrusion portion 731 of the intermediate member 73.

Positioning Mechanism 7B

Figure 11:
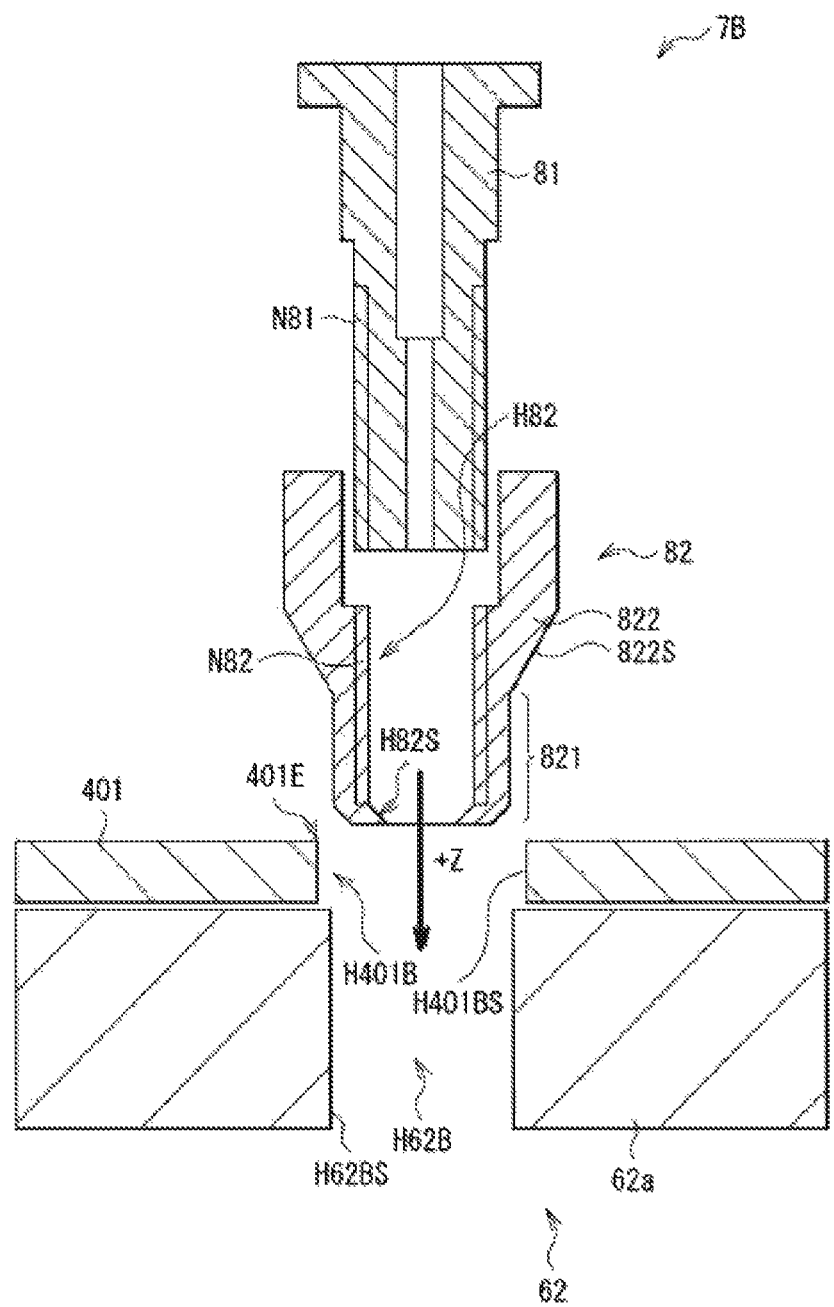
FIG. 11 is an enlarged sectional view illustrating the other positioning mechanism in a state before the liquid ejecting head illustrated in FIG. 1 is mounted on a carriage.
Figure 12:
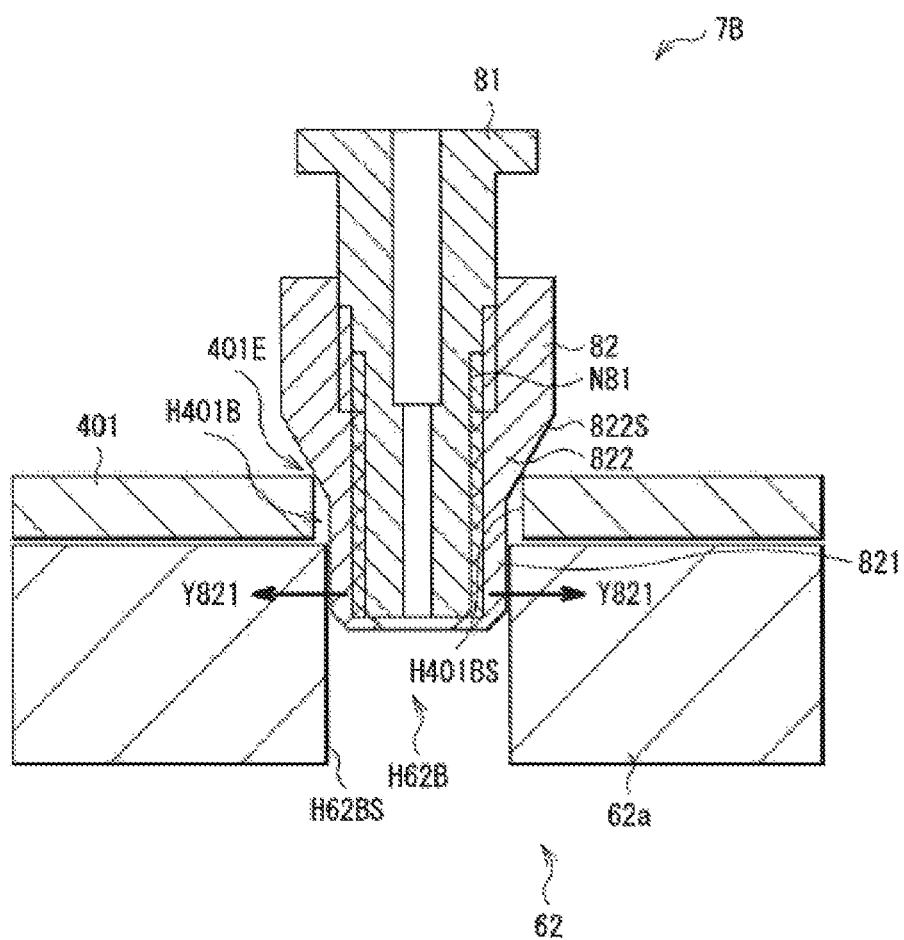
FIG. 12 is an enlarged sectional view illustrating the other positioning mechanism in a state where the liquid ejecting head illustrated in FIG. 1 is mounted on a carriage.
Figure 13A:
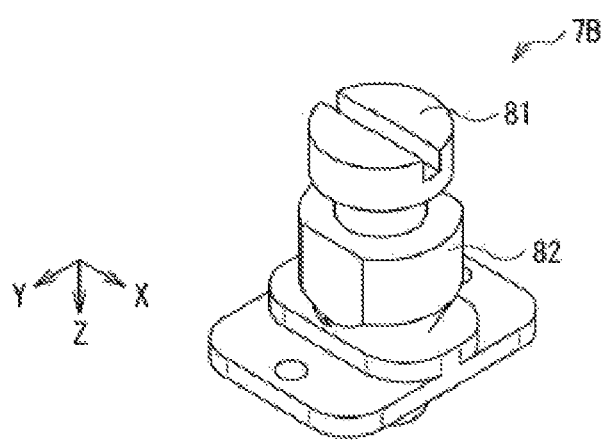
FIG. 13A is an enlarged perspective view illustrating the other positioning mechanism illustrated in FIG. 4.
Figure 13B:
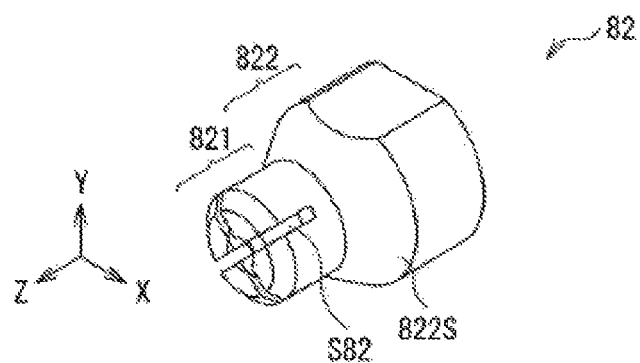
FIG. 13B is an enlarged perspective view illustrating a portion of the other positioning mechanism illustrated in FIG. 13A.
Figure 14:
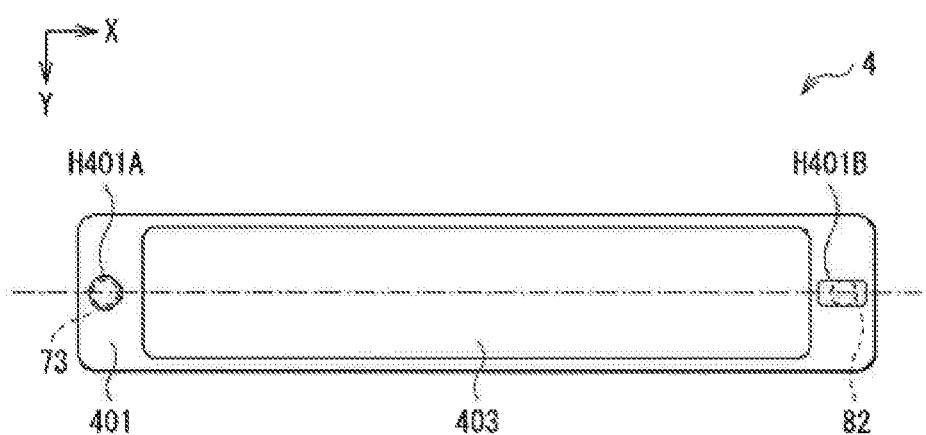
FIG. 14 is a plan view illustrating the liquid ejecting head illustrated in FIG. 1.

Next, a configuration of the positioning mechanism 7B will be described in detail with reference to FIGS. 11 to 14. FIG. 11 is an enlarged sectional view schematically illustrating the positioning mechanism 7B and the vicinity thereof in a state before the ink jet head 4 (base plate 401) is mounted on the pedestal 62a of the carriage 62. FIG. 12 is an enlarged sectional view schematically illustrating the positioning mechanism 7B and the vicinity thereof in a state before the ink jet head 4 (base plate 401) is mounted on the pedestal 62a of the carriage 62. FIG. 13A is a perspective view illustrating the external appearance of the positioning mechanism 7B. FIG. 13B is a perspective view illustrating the external appearance of an intermediate member 82 in the positioning mechanism 7B. FIG. 14 is a plan view illustrating a state when the ink jet head 4 is viewed from the head chip 403 side.

As illustrated in FIGS. 11, 12, and 13A, the positioning mechanism 7B includes a positioning member 81 and the intermediate member 82. As illustrated in FIG. 13B, the intermediate member 82 includes an expansion portion 821 and an inclined portion 822. A plurality of slits S82 extending in the Z-axis direction may be provided in the expansion portion 821. A hole H82 penetrating the intermediate member 82 in the Z-axis direction is provided in the intermediate member. The intermediate member 82 may be made of a material which is elastically deformed easier than that of the base plate 401 or the carriage 62, for example. Here, the positioning member 81 is a specific example corresponding to "a third positioning member" of the disclosure. The intermediate member 82 is a specific example corresponding to "a second intermediate member" of the disclosure. The expansion portion 821 of the intermediate member 82 is a specific example corresponding to "a third expansion portion" of the disclosure. The hole H82 of the intermediate member 82 is a specific example corresponding to "a third insertion hole" of the disclosure.

A hole H62B into which the expansion portion 821 of the intermediate member 82 is inserted is provided at a position of the pedestal 62a of the carriage 62. A hole H401B is provided at a position in the base plate 401, which corresponds to the hole H62B in the Z-axis direction. The position of the hole H62B is set to be different from that of the hole H62A. The hole H62B in the pedestal 62a of the carriage 62 has an inner surface H62BS. The hole H401B of the base plate 401 has an inner surface H401BS. As illustrated in FIG. 14, the hole H401A is provided at one end of the base plate 401, and the hole H401B is provided at the other end of the base plate. Here, as illustrated in FIG. 14, the hole H401B in the base plate 401 may be a long hole having a major axis in the X-axis direction and a minor axis in the Y-axis direction. In this case, the hole H401A may be provided on a line of extending the major axis of the hole H401B being a long hole, in the base plate 401. The hole H62B in the pedestal 62a of the carriage 62 is a specific example corresponding to "a first auxiliary hole" of the disclosure. The inner surface H62BS in the pedestal 62a of the carriage 62 is a specific example corresponding to "a third inner surface" of the disclosure. The hole H401B of the base plate 401 is a specific example corresponding to "a second auxiliary hole" of the disclosure.

The expansion portion 821 of the intermediate member 82 is pressed on the positioning member 81 and deforms (for example, elastically deforms) to expand in the radial direction Y821 (see FIG. 12) intersecting with the insertion direction (+Z direction) of the expansion portion 821, if the positioning member 81 is inserted into the hole H82. The expansion portion 821 inserted into the hole H62B may abut on the inner surface H62BS by such deformation. The inclined portion 822 of the intermediate member 82 is a portion having a dimension (dimension in the XY plane) in the radial direction Y821 as becoming farther from the expansion portion 821 in the Z-axis direction. The inclined portion 822 has an inclined surface 822S inclined from the Z-axis direction. The inclined surface 822S abuts on an edge 401E, in a state where the expansion portion 821 positioned at the tip end of the intermediate member 82 is deeply inserted into the hole H62B.

As illustrated in FIGS. 11 and 12, the positioning member 81 includes a portion which includes screw threads N81 formed on the outer circumferential surface and extends in the Z-axis direction. The screw threads N81 of the positioning member 81 screw to screw threads N82 of the intermediate member 82. Thus, the dimensions of the expansion portion 821 in the radial direction Y821 increase by the positioning member 81 moving to the intermediate member 82 in the +Z direction with rotating.

Positioning Method of Ink Jet Head 4 by Positioning Mechanisms 7A and 7B

Here, a positioning method of the ink jet head 4 for the carriage 62 by the positioning mechanisms 7A and 7B which are described above will be described.

In the embodiment, as illustrated in FIG. 8, the intermediate member 73 is fixed to the base plate 401. Specifically, when the screw hole K730 provided in the base portion 730 of the intermediate member 73 is caused to overlap the screw hole K401 provided in the base plate 401, the intermediate member 73 is fastened to the base plate 401 by the screw 74 screwing to both the screw hole K401 and the screw hole K730.

Then, the ink jet head 4 is placed on the pedestal 62a so as to insert the protrusion portion 731 of the intermediate member 73 into the hole H62A provided in the pedestal 62a of the carriage 62. At this time, the hole H401B provided at the other end of the base plate 401 is set to substantially coincide with the hole H62B provided in the pedestal 62a.

In this state, the ink jet head 4 is aligned to the pedestal 62a of the carriage 62 by using the positioning members 71 and 72. Specifically, as illustrated in FIG. 9, the shaft portion 711 of the positioning member 71 is inserted into the hole H73 of the intermediate member 73, and the screw threads N711 of the shaft portion 711 of the positioning member 71 are caused to screw to the screw threads N72 of the positioning member 72. Tightening is performed by rotating the positioning member 72 using a Z axis as a rotation axis, and thus the positioning member 71 is caused to move to the intermediate member 73 in a −Z direction. As a result, the protrusion portion 731 of the intermediate member 73, which has been pressed by the tapered surface 712S of the tapered portion 712 is expanded in the radial direction Y731 and abuts on the inner surface H62AS of the hole H62A provided in the pedestal 62a of the carriage 62. Thus, aligning between the center position of the hole H62A in the pedestal 62a and the center position of the hole H73 of the intermediate member 73 is performed.

As illustrated in FIGS. 11 and 12, the expansion portion 821 of the intermediate member 82 is inserted into the hole H401B of the base plate 401 and the hole H62B of the pedestal 62a in the carriage 62. At this time, substantial aligning of the intermediate member 82 with the base plate 401 is performed by causing the inclined surface 822S of the inclined portion 822 to abut on the edge 401E. Here, as illustrated in FIG. 14, the hole H401B of the base plate 401 is a long hole having a major axis in the X-axis direction and a minor axis in the Y-axis direction. Thus, even in a case where the hole H401B of the base plate 401 is slightly shifted from the hole H62B provided in the pedestal 62a of the carriage 62 in the X-axis direction, it is possible to cause the expansion portion 821 of the intermediate member 82 to communicate with the hole H401B of the base plate 401 and the hole H62B of the pedestal 62a in the carriage 62. Regarding a shift between the hole H401B of the base plate 401 and the hole H62B of the pedestal 62a in the carriage 62 in the Y-axis direction, the hole H401B and the hole H62B can be caused to overlap each other by rotating the base plate 401 with the center position of the intermediate member 73 in the XY plane as the rotation center.

When the expansion portion 821 of the intermediate member 82 has been inserted into the hole H401B of the base plate 401 and the hole H62B, the positioning member 81 is inserted into the hole H82 of the intermediate member 82. Specifically, the screw threads N82 of the intermediate member 82 are caused to screw to the screw threads N81 of the positioning member 81, and tightening is performed by rotating the positioning member 81 with the Z axis as a rotation axis. Thus, the positioning member 81 is caused to move to the intermediate member 82 in the +Z direction. As a result, the tapered surface H82S provided at the tip end of the inner surface of the hole H82 in the intermediate member 82 abuts on the tip end of the positioning member 81. Accordingly, the expansion portion 821 of the pressed intermediate member 82 is expanded in the radial direction Y821, and the expansion portion 821 of the intermediate member 82 abuts on the inner surface H62BS of the hole H62B in the pedestal 62a of the carriage 62. Thus, aligning between the hole H62B of the pedestal 62a in the carriage 62 and the intermediate member 82 is performed.

If aligning of the ink jet head 4 to the carriage 62 by the positioning mechanisms 7A and 7B is completed, the pedestal 62a and the base plate 401 are fastened to each other by screws and the like which are separately provided. Accordingly, it is possible to firmly fix the carriage 62 and the ink jet head 4 to each other.

Operation

A. Base Operation of Printer 1

In the printer 1, a recording operation (print operation) of an image, characters, or the like on recording sheet P is performed in a manner as follows. An initial state is assumed to be a state where each of the four kinds of ink tanks 3 (3Y, 3M, 3C, and 3B) illustrated in FIG. 1 stores inks having the corresponding color and a sufficient amount. The ink in the ink tank 3 is in a state where the ink jet head 4 has been filled with the ink through the circulation mechanism 5.

If the printer 1 is operated in such an initial state, the grid roller 21 in each of the transporting mechanisms 2a and 2b rotates. Thus, the recording sheet P is transported between the grid roller 21 and the pinch roller 22 in the transport direction d (X-axis direction). Simultaneous with such a transport operation, the driving motor 633 in the driving mechanism 63 rotates each of the pulleys 631a and 631b, so as to operate the endless belt 632. Thus, while the carriage 62 is guided on the guide rails 61a and 61b, the carriage performs reciprocating in the width direction (Y-axis direction) of the recording sheet P. At this time, a recording operation of an image, characters, or the like on the recording sheet P is performed in a manner that the inks of the four colors are properly discharged to the recording sheet P by the ink jet head 4 (4Y, 4M, 4C, and 4B).

B. Detailed Operation of Ink Jet Head 4

Next, the detailed operation (ejection operation of the ink) of the ink jet head 4 will be described with reference to FIGS. 1, 2, and 5 to 7. That is, in the ink jet head 4 (ink jet head of side shot type and circulation type) in the embodiment, the ejection operation of the ink is performed by using a shear mode in a manner as follows.

Firstly, if reciprocating of the carriage 62 (see FIG. 1) is started, the controller applies a driving voltage to the drive electrode Ed (common electrode Edc and the active electrode Eda) in the ink jet head 4, through the flexible printed circuit board 44. Specifically, the controller 40 applies the driving voltage to each drive electrode Ed disposed on a pair of drive walls Wd forming the discharge channels C1e and C2e. Thus, each of the pair of drive walls Wd deforms to protrude toward dummy channels C1*d* and C2*d* which are adjacent to the discharge channels C1*e* and C2*e* (see FIG. 7).

Here, as described above, in the actuator plate 42, the polarization direction is set to be in one direction and the drive electrode Ed is formed only up to the intermediate position of the depth direction of the drive wall Wd on the inner side surface thereof. Therefore, the drive wall Wd deforms to be bent by the controller 40 applying the driving voltage, such that the drive wall Wd has a V shape based on the intermediate position of the drive wall Wd in the depth direction as the center. Such bending deformation of the drive wall Wd causes the discharge channels C1*e* and C2*e* to, for example, expand.

As described above, the volumes of the discharge channels C1*e* and C2*e* increase by bending deformation which occurs by a piezoelectric thickness sliding effect in the pair of drive walls Wd. Since the volumes of the discharge channels C1*e* and C2*e* increase, the ink 9 stored in the inlet-side common ink rooms 431*a* and 432*a* is introduced into the discharge channels C1*e* and C2*e* (see FIG. 5).

Then, the ink introduced into the discharge channels C1*e* and C2*e* in this manner comes into having a pressure wave, and this pressure wave propagates into the discharge channels C1*e* and C2*e*. The driving voltage applied to the drive electrode Ed becomes 0 (zero) V at a timing when the pressure wave reaches the nozzles H1 and H2 of the nozzle plate 41. Thus, the drive wall Wd is restored from the above being bending deformation state, and as a result, the volumes of the discharge channels C1*e* and C2*e* which have increased are brought back to the original state (see FIG. 7).

If the volumes of the discharge channels C1*e* and C2*e* are brought back to the original state in this manner, pressure in the discharge channels C1*e* and C2*e* increases, and the ink in the discharge channels C1*e* and C2*e* is pressurized. As a result, the ink having a liquid droplet shape is discharged to the outside thereof (toward the recording sheet P) through the nozzles H1 and H2 (see FIG. 7). The ejection operation (discharge operation) of the ink in the ink jet head 4 is performed in this manner. As a result, the recording operation of an image, characters, or the like on the recording sheet P is performed.

In particular, as described above, since each of the nozzles H1 and H2 in the embodiment has a tapered shape having a diameter which gradually decreases toward the lower side (see FIG. 7), it is possible to discharge the ink straight at a high speed (with high rectilinearity). Accordingly, it is possible to perform recording for high quality.

Advantageous Effects

Next, advantageous effects of the ink jet head 4 and the printer 1 in the embodiment will be described in detail.

In the embodiment, if the positioning member 71 is inserted into the hole H73 of the intermediate member 73, the protrusion portion 731 in the intermediate member 73 expands in the radial direction Y731, and the expanded protrusion portion 731 of the intermediate member 73 is caused to abut on the inner surface H62AS of the hole H62A in the pedestal 62*a* of the carriage 62. In the pedestal 62*a* of the carriage 62, the inner surface H62AS of the hole H62A has machining precision higher than that of the edge 62E (see FIG. 8) of the hole H62A, for example. The edge 62E of the hole H62A is a portion at which "burr" or "sagging" easily occurs when, for example, the hole H62A is produced (drilling is performed), and dimension precision is lower than that of the inner surface H62AS of the hole H62A. The inner surface H62AS of the hole H62A can be machined at high dimension precision by a drill machine or the like. Therefore, it is possible to relatively easily improve position accuracy of the intermediate member 73 with respect to the pedestal 62*a* of the carriage 62 by positioning the protrusion portion 731 of the intermediate member 73 based on the inner surface H62AS of the hole H62A in the pedestal 62*a* of the carriage 62. Thus, in the printer 1 in the embodiment, it is possible to reduce variation in print quality before and after replacement of the ink jet head 4, without performing complicated position adjustment.

In the embodiment, the dimensions of the protrusion portion 731 in the radial direction Y731 increase with the positioning member 71 moving to the protrusion portion 731 in the insertion direction (+Z direction). Specifically, the positioning member 71 includes the shaft portion 711 on which the screw threads N711 are formed, and the tapered portion 712 having dimensions in the radial direction Y731, which increase as becoming farther from the shaft portion 711 in the insertion direction (+Z direction). Thus, the dimensions of the protrusion portion 731 in the radial direction Y731 change in accordance with relative change of the position of the positioning member 71 in the Z-axis direction to the protrusion portion 731. As a result, it is possible to finely adjust the center position of the protrusion portion 731 of the intermediate member 73 and the center position of the hole H62A in the pedestal 62*a* of the carriage 62 by finely adjusting the position of the positioning member 71 in the Z-axis direction, and it is possible to perform aligning with higher precision. Accordingly, in the printer 1 in the embodiment, it is possible to more reduce the variation in print quality before and after the replacement of the ink jet head 4.

In the embodiment, satisfying Conditional Expression (1) is assumed. Since the inner diameter φA of the hole H62A in the pedestal 62*a* of the carriage 62 is greater than the outer diameter φB1 of the contracted protrusion portion 731, the protrusion portion 731 in a state where the positioning member 71 is not inserted into the hole H73 can be inserted into the hole H62A. Since the outer diameter φB2 of the expanded protrusion portion 731 is equal to or greater than the inner diameter φA of the hole H62A, the protrusion portion 731 in a state where the positioning member 71 is inserted into the hole H73 can abut on the inner surface 62AS of the hole H62A. In the embodiment, the relative position between the intermediate member 73 and the reference position (for example, position of the reference nozzle among the nozzles H1 and H2) of the ink jet head 4 may be defined in advance, and the intermediate member 73 may be fixed at a predetermined position. In this case, an error component caused by the intermediate member 73 is eliminated, and the positioning accuracy of the inkjet head 4 with respect to the pedestal 62*a* of the carriage 62 is further improved.

In the embodiment, the positioning member 81 and the intermediate member 82 are further provided. The carriage 62 further includes the hole H62B provided at a position different from that of the hole H62A. The expansion portion 821 is capable of being inserted into the hole H62B and abutting on the inner surface H62BS by expanding in the radial direction Y821. With such a configuration, aligning between the hole H62A and the intermediate member 73 is performed at high precision, and aligning between the hole H62A and the intermediate member 82 is performed at high precision. Thus, in the printer 1 in the embodiment, it is possible to further reduce the variation in print quality before and after the replacement of the ink jet head 4.

In the embodiment, the base plate 401 in which the hole H401A is provided at the position corresponding to the hole H62A and the hole H401B is provided at the position corresponding to the hole H62B is provided. The hole H401B is set to be a long hole and the hole H401A is set to be provided on a line of extending the major axis of the long hole. Thus, it is possible to finely adjust the position of the intermediate member 82 in the XY plane. Accordingly, even in a case where a dimensional error occurs in machining, that is, even in a case where a distance between the hole H62A and the hole H62B in the pedestal 62a of the carriage 62 is different from a distance between the intermediate member 73 and the intermediate member 82, it is possible to easily perform aligning between the carriage 62, and the intermediate member 73 and the intermediate member 82, with high precision.

As described above, according to the ink jet head 4 in the embodiment, the ink jet head can have a simple configuration, and it is possible to mount the ink jet head in the carriage 62 with high position accuracy. In the embodiment, the positioning mechanism 7B having a configuration which is similar to that of the positioning mechanism 7A may be employed.

2. MODIFICATION EXAMPLE

Next, modification examples (Modification Examples 1 to 5) of the embodiment will be described. The same components as those in the above embodiment are denoted by the same reference signs, and descriptions thereof will be appropriately omitted.

Modification Example 1

Figure 15:
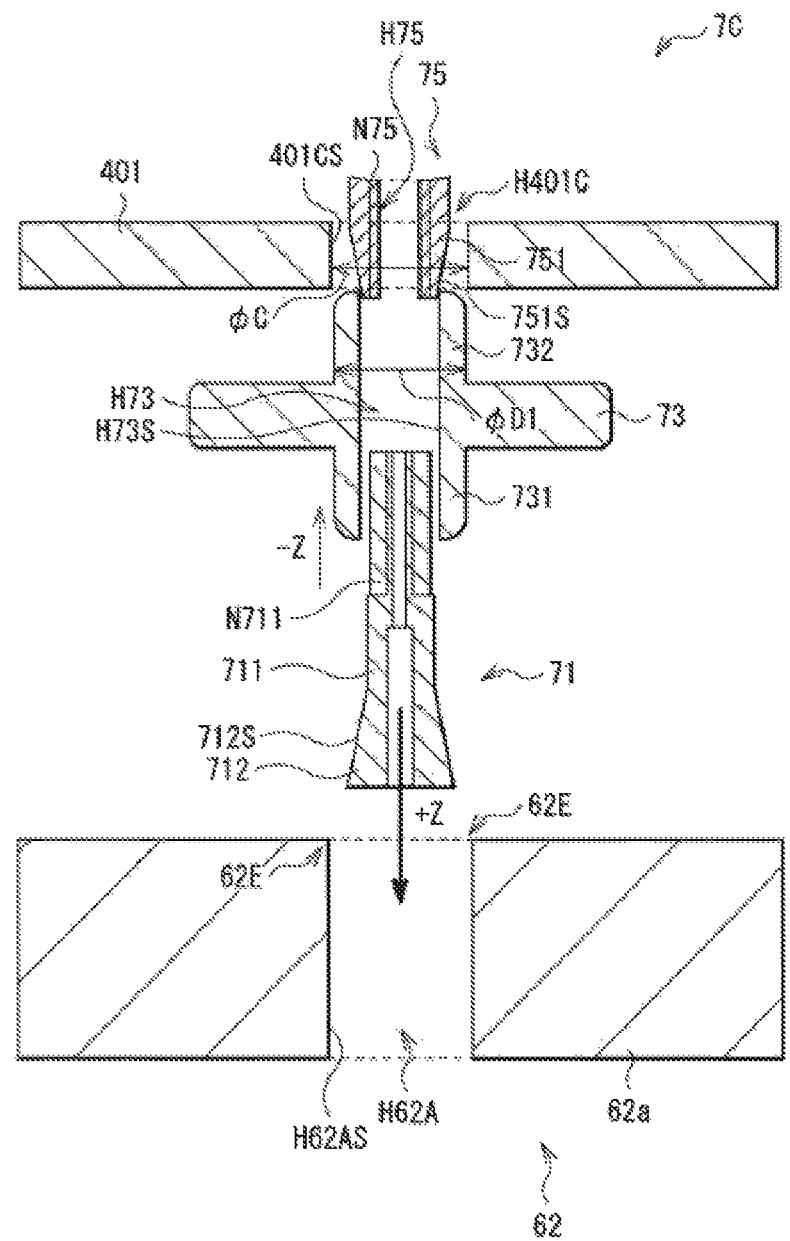
FIG. 15 is an enlarged sectional view illustrating a positioning mechanism in a state before the liquid ejecting head is mounted on the carriage, according to Modification Example 1 of the disclosure.
Figure 16:
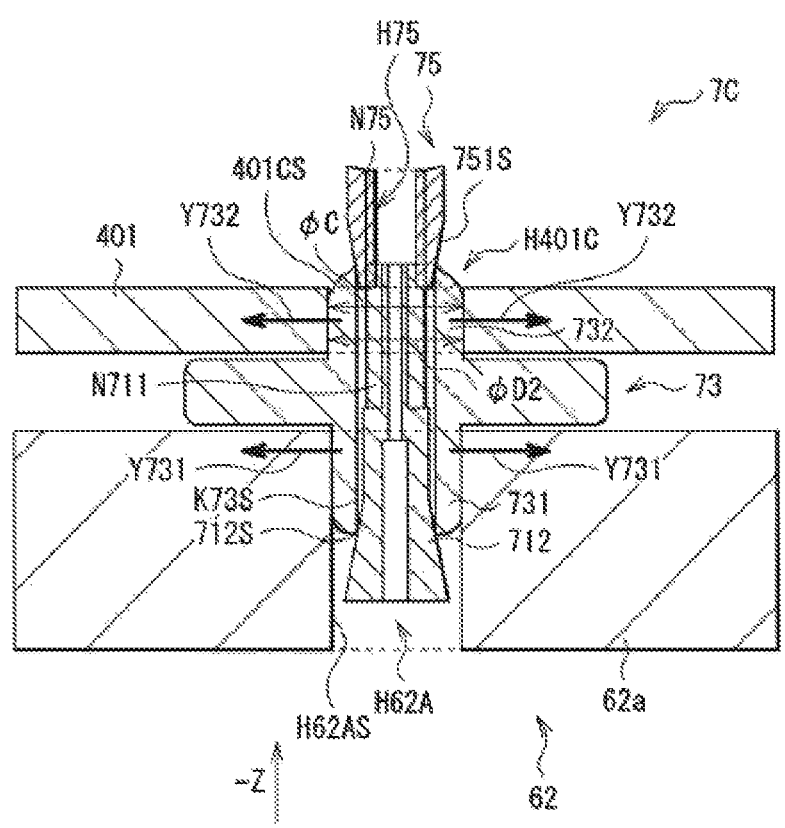
FIG. 16 is an enlarged sectional view illustrating a positioning mechanism in a state where the liquid ejecting head is mounted on the carriage, according to Modification Example 1 of the disclosure.

Firstly, a configuration of a positioning mechanism 7C as Modification Example 1, which can be applied to the ink jet head 4 instead of the positioning mechanism 7A described in the embodiment will be described in detail with reference to FIGS. 15 and 16. FIG. 15 is an enlarged sectional view schematically illustrating the positioning mechanism 7C and the vicinity thereof in a state before the ink jet head 4 (base plate 401) is mounted on the pedestal 62a of the carriage 62. FIG. 16 is an enlarged sectional view schematically illustrating the positioning mechanism 7C and the vicinity thereof in a state where the ink jet head 4 (base plate 401) is mounted on the pedestal 62a of the carriage 62.

As illustrated in FIGS. 15 and 16, the positioning mechanism 7C in Modification Example 1 includes the positioning member 71 and the intermediate member 73 and includes a positioning member 75 instead of the positioning member 72. The positioning member 71 and the intermediate member 73 are substantially the same as those illustrated in FIGS. 8 to 10B. However, the screw hole K730 may not be provided in the base portion 730 of the intermediate member 73.

In the positioning mechanism 7C in Modification Example 1, a screw hole K401A is not provided in the base plate 401, and a hole H401C instead of the hole H401A is formed at the position in the base plate 401, which corresponds to the hole H62A. The hole H401C is a space defined by an inner surface H401CS and is provided at the position corresponding to the hole H62A.

The positioning member 75 includes an inclined portion 751 including a tapered surface 751S, on the outer circumferential surface thereof. The positioning member 75 is provided to be capable of screwing to the positioning member 71. The positioning member 75 is a nut-like member having an annular external appearance, in which screw threads N75 are formed on an inner surface for forming a hole H75. The shaft portion 711 of the positioning member 71 is inserted by the screw thread N75 screwing to the screw thread N711.

If the positioning member 75 rotates, for example, rightward with respect to the positioning member 71, the positioning member 71 and the positioning member 75 can become close to each other in the Z-axis direction. At this time, the tapered surface 712S of the positioning member 71 presses the inner surface H73S of the tip end portion of the protrusion portion 731 in the radial direction Y731, and the inner surface H73S expands. In addition, the tapered surface 751S of the positioning member 75 presses the inner surface H73S of the tip end portion of the protrusion portion 732 in a radial direction Y732, and thus the inner surface H73S expands more (see FIG. 16). The protrusion portion 731 which has deformed to expand in the radial direction Y731 can abut on the inner surface 62AS. The protrusion portion 732 which has deformed to expand in the radial direction Y732 can abut on the inner surface H401CS. Thus, it is noted that FIG. 15 illustrates a situation when the protrusion portions 731 and 732 contract. This situation corresponds to a stage before the protrusion portions 731 and 732 respectively expand in the radial directions Y731 and Y732. In addition, it is noted that FIG. 16 illustrates a situation when the protrusion portions 731 and 732 expand. This situation corresponds to a stage after the protrusion portions 731 and 732 are respectively expanded in the radial directions Y731 and Y732.

Here, the inner surface H401CS, the hole H401C, the base plate 401, the positioning member 75, the protrusion portion 732, and the hole H75 are specific examples corresponding to "a second inner surface", "a second positioning hole", "a base plate", "a second positioning member", "a second expansion portion", and "a second insertion hole", respectively.

It is desirable that the positioning mechanism 7C in Modification Example 1 satisfies Conditional Expression (2) in addition to Conditional Expression (1).

$$\phi D1 < \phi C \leq \phi D2 \quad (2)$$

$\phi C$ indicates the inner diameter of the hole H401C. $\phi D1$ indicates the outer diameter of the contracted protrusion portion 732. $\phi D2$ indicates the outer diameter of the expanded protrusion portion 732.

As described above, the positioning mechanism 7C in Modification Example 1 further includes the positioning member 75 provided to be capable of screwing to the positioning member 71. The hole H401C including the inner surface H401CS is provided at the position corresponding to the hole H62A in the Z-axis direction, in the base plate 401. Here, the positioning member 75 includes the hole H75 communicating with the hole H73. The intermediate member 73 further includes the protrusion portion 732 being capable of being inserted into the hole H401C in the -Z direction and abutting on the inner surface H401CS by expanding in the radial direction Y732. The protrusion portion 732 passes through the hole H73 through which the shaft portion 711 of the positioning member 71 penetrates the intermediate member 73, and then is inserted into the hole H75. Then, the protrusion portion 732 is biased by the screw threads N711 of the shaft portion 711 screwing to the screw threads N75 of the positioning member 75. Thus, the protrusion portion 732 is biased, so as to be expanded in the radial direction Y732. Since the positioning mechanism 7C in Modification Example 1 has such a configuration, it is possible to easily perform aligning of the intermediate member 73 to the carriage 62 and aligning of the intermediate member 73 to the base plate 401, with high precision. As a result, it is possible to easily perform aligning of the ink jet head 4 to the carriage 62 with high precision.

The positioning mechanism 7C in Modification Example 1 further includes the positioning member 75 provided to be capable of screwing to the positioning member 71. The intermediate member 73 further includes the protrusion portion 732 including the hole H73 penetrating the intermediate member 73. The protrusion portion 732 expands in the radial direction Y732 by the positioning member 71 moving to the hole H73 and the positioning member 75 being inserted into the hole H73. Therefore, the positioning mechanism 7C can cause the ink jet head 4 to be mounted on the pedestal 62a of the carriage 62 in both the +Z direction and the −Z direction.

In Modification Example 1, it is assumed that the positioning mechanism 7C is employed instead of the positioning mechanism 7A in the embodiment. However, the positioning mechanism 7C may be employed instead of the positioning mechanism 7B in the embodiment.

Modification Example 2

Figure 17:
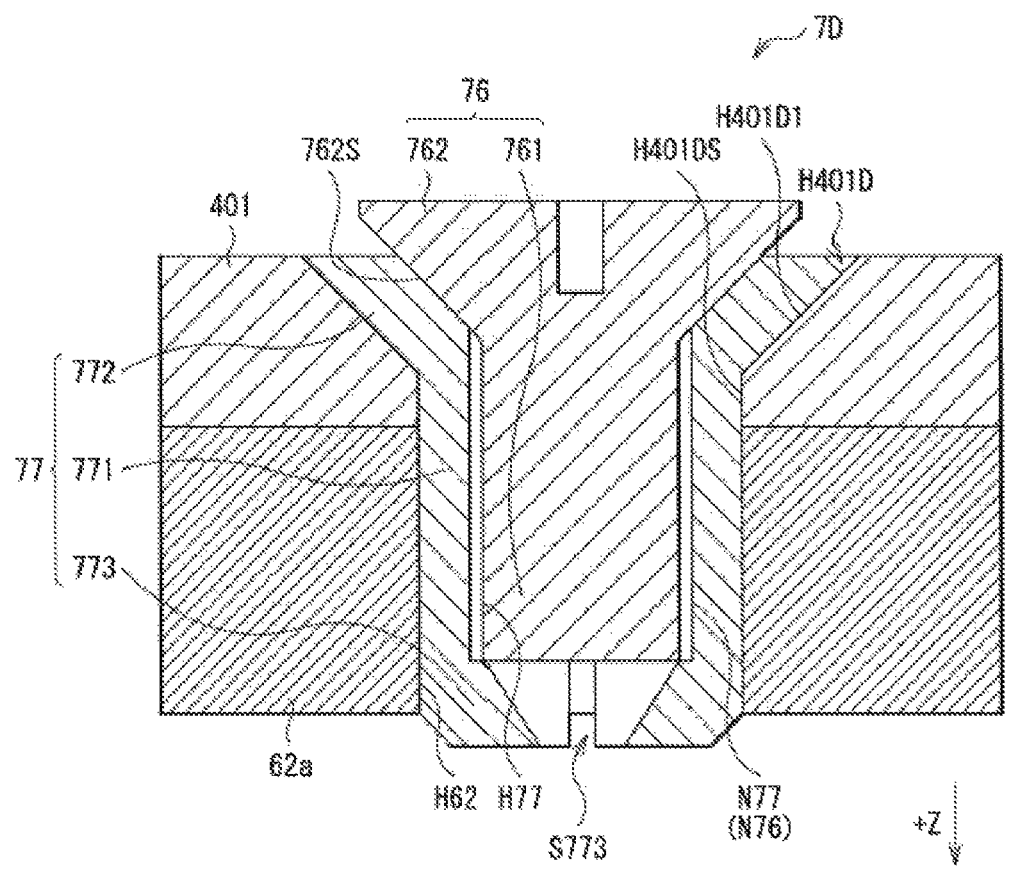
FIG. 17 is an enlarged sectional view illustrating a positioning mechanism according to Modification Example 2 of the disclosure.
Figure 18:
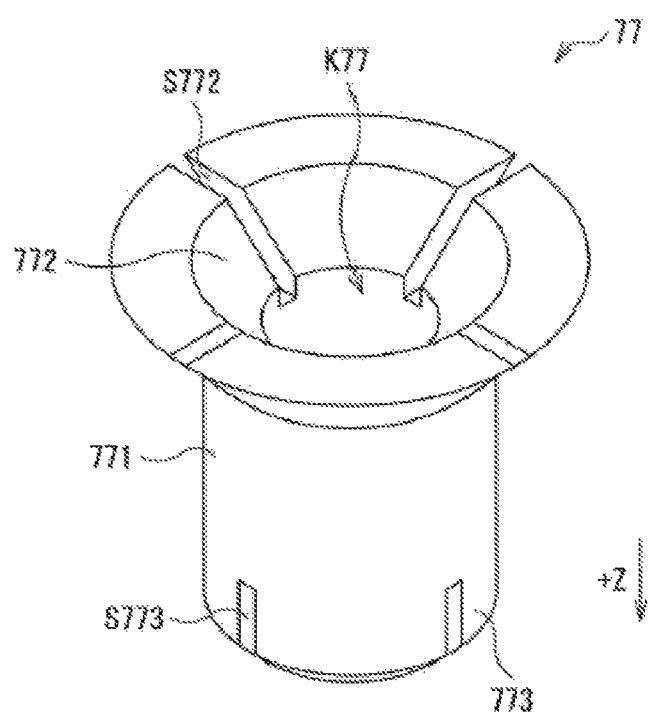
FIG. 18 is an enlarged perspective view illustrating a constituent component of the positioning mechanism according to Modification Example 2 of the disclosure.

Next, a configuration of a positioning mechanism 7D as Modification Example 2, which can be applied to the ink jet head 4 instead of the positioning mechanism 7A described in the embodiment will be described in detail with reference to FIGS. 17 and 18. FIG. 17 is an enlarged sectional view schematically illustrating the positioning mechanism 7D and the vicinity thereof in a state where the ink jet head 4 (base plate 401) is mounted on the pedestal 62a of the carriage 62. FIG. 18 is a perspective view illustrating an external appearance of an intermediate member 77 constituting the positioning mechanism 7D.

As illustrated in FIG. 17, the positioning mechanism 7D includes a positioning member 76 and the intermediate member 77. A hole H401D is provided in the base plate 401. The hole H401D is a space defined by a chamfered inclined surface H401D1 and an inner surface H401DS extending in the Z-axis direction. The hole H401D of the base plate 401 is provided at a position corresponding to the hole H62 in the Z-axis direction. The inner diameter of a portion of the hole H401D in the base plate 401, which is defined by the inner surface H401DS is substantially equal to the inner diameter of the hole H62 in the pedestal 62a of the carriage 62.

As illustrated in FIG. 18, the intermediate member 77 includes a main body portion 771, an inclined portion 772, and a tip end portion 773. The intermediate member 77 may be made of a material which is elastically deformed easier than that of the base plate 401 or the carriage 62, for example. The main body portion 771 is a columnar member extending in the Z-axis direction. The main body portion 771 has an outer diameter which is substantially equal to or slightly greater than the inner diameter of the hole H62 in the pedestal 62a of the carriage 62. The inclined portion 772 has a shape having dimensions in the radial direction, which increase as becoming farther from the main body portion 771. The tip end portion 773 is positioned on an opposite side of the inclined portion 772 when viewed from the main body portion 771. As illustrated in FIG. 17, the tip end portion 773 includes an inclined inner surface and is configured to cause the inner diameter thereof to gradually decrease as becoming closer to the tip end. A plurality of slits S772 and S773 extending in the Z-axis direction may be provided in each of the inclined portion 772 and the tip end portion 773 (see FIG. 18).

As illustrated in FIG. 17, the main body portion 771 can pass through the hole H401D of the base plate 401 and then be inserted into the hole H62 in the pedestal 62a of the carriage 62. The inclined portion 772 is set to abut on the inclined surface H401D1 of the hole H401D in the base plate 401. The inclined surface H401D1 is inclined with corresponding to an inclined angle of the inclined portion 772. A hole H77 which penetrates the intermediate member 77 in the Z-axis direction and is defined by an inner surface on which screw threads N77 are formed is provided in the intermediate member 77. The positioning member 76 is set to be inserted into the hole H77. The positioning member 76 is a screw member including screw threads N76 screwing to the screw threads N77 of the intermediate member 77. The positioning member 76 includes a shaft portion 761 extending in the Z-axis direction and a head portion 762 having dimensions in the radial direction, which increase as being farther from the shaft portion 761 in the Z-axis direction. The shaft portion 761 has an outer diameter which is slightly greater than the inner diameter of the hole H77 in the main body portion 771. The head portion 762 includes an inclined surface 762S inclined along the inclined portion 772.

Here, the positioning member 76 is a specific example corresponding to "the first positioning member" of the disclosure. The intermediate member 77 is a specific example corresponding to "the first intermediate member" of the disclosure. The main body portion 771 is a specific example corresponding to "the first expansion portion" of the disclosure. The inclined portion 772 is a specific example corresponding to "the second expansion portion" of the disclosure. The hole H77 is a specific example corresponding to "the first insertion hole" of the disclosure. The inclined surface H401D1 is a specific example corresponding to "an edge portion" of the disclosure. The hole H401D is a specific example corresponding to "the second positioning hole" of the disclosure.

In the positioning mechanism 7D in Modification Example 2, the positioning member 76 is inserted into the hole H77 in a state where the main body portion 771 passes through the hole H401D and is inserted into the hole H62 and the inclined portion 772 abuts on an inclined surface 401D1 of a hole H401G. If the positioning member 76 is inserted into the hole H77 and is fastened, the intermediate member 77 is pressed on the positioning member 76 and deforms (for example, elastically deforms) to expand in the radial direction intersecting with the insertion direction (+Z direction) thereof. Thus, since the main body portion 771 and the inclined portion 772 of the expanded intermediate member 77 abut on the inclined surface H401D1 and the inner surface H401DS of the base plate 401, aligning between the hole H62 in the pedestal 62a of the carriage 62 and the hole H401D of the base plate 401 is performed.

As described above, in the positioning mechanism 7D in Modification Example 2, it is possible to perform aligning between the hole H62 in the pedestal 62a of the carriage 62 and the hole H401D of the base plate 401, by using the main body portion 771 and the inclined portion 772 in the intermediate member 73. As a result, it is possible to easily perform aligning between the pedestal 62a of the carriage 62 and the base plate 401 of the ink jet head 4.

Modification Example 3

Figure 19:
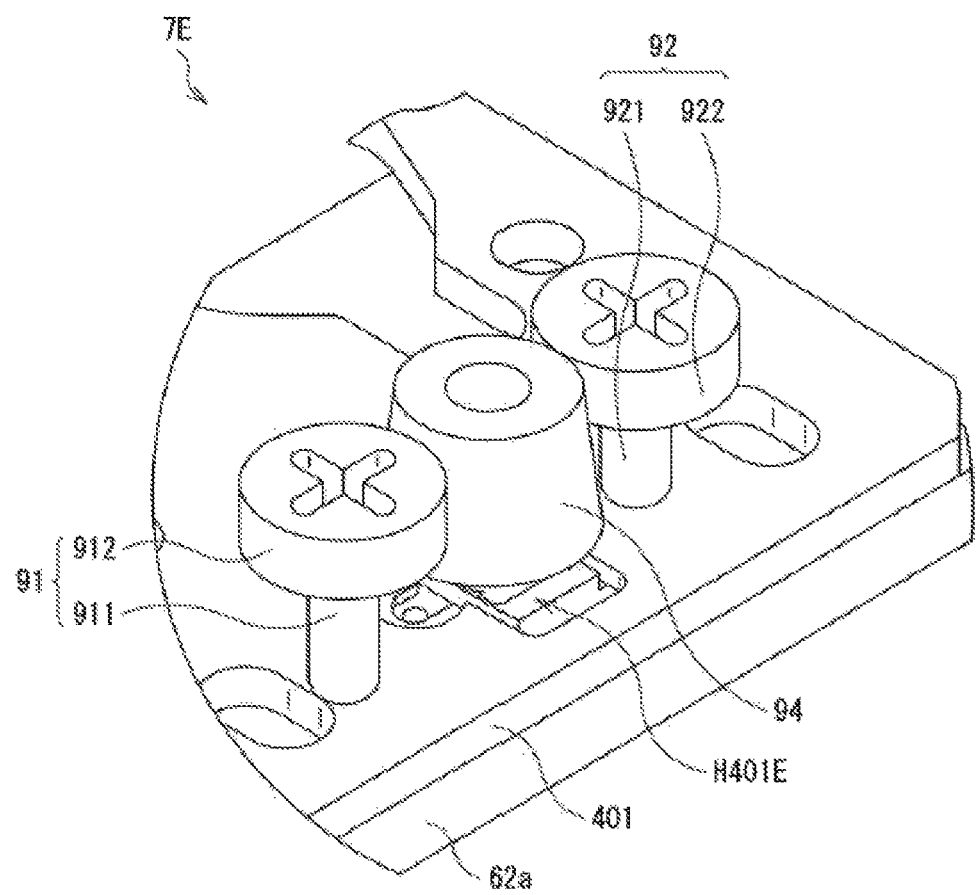
FIG. 19 is an enlarged perspective view illustrating a positioning mechanism according to Modification Example 3 of the disclosure.
Figure 20A:
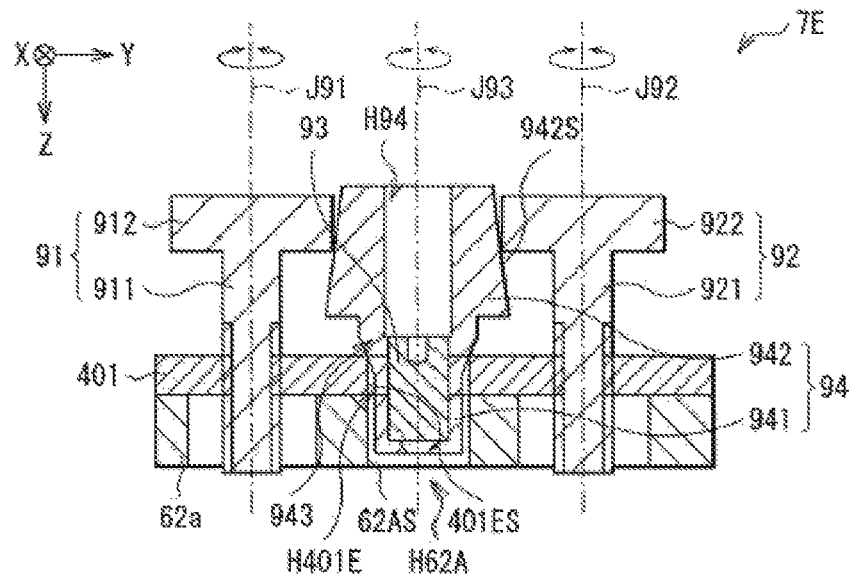
FIG. 20A is an enlarged sectional view illustrating the positioning mechanism according to Modification Example 3 of the disclosure.
Figure 20B:
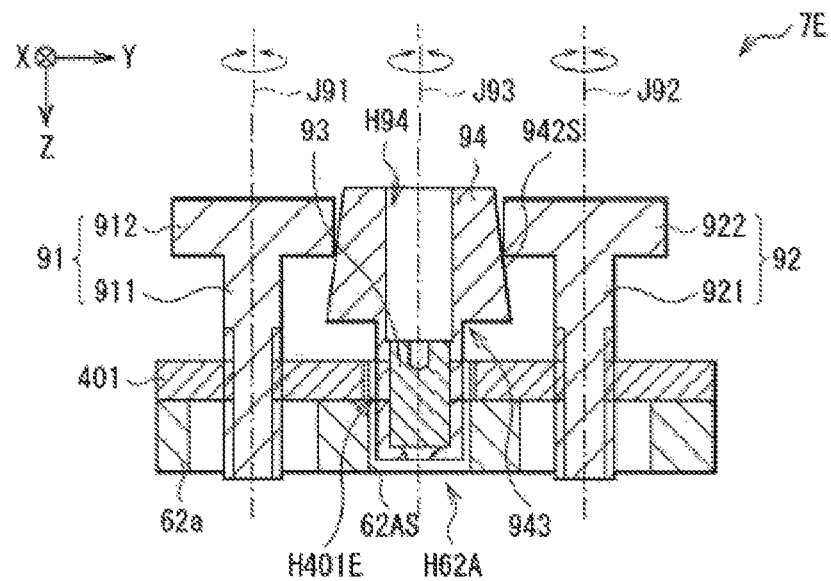
FIG. 20B is another enlarged sectional view illustrating the positioning mechanism according to Modification Example 3 of the disclosure.
Figure 21A:
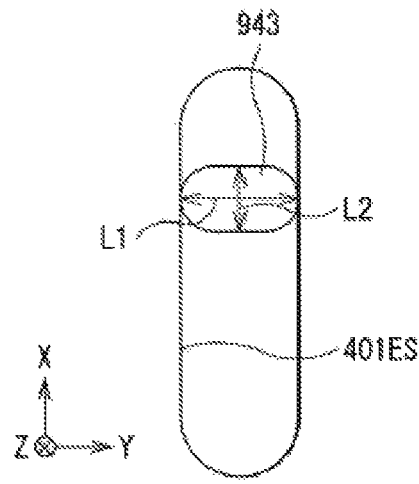
FIG. 21A is a plan view illustrating the main portion of the positioning mechanism according to Modification Example 3 of the disclosure.
Figure 21B:
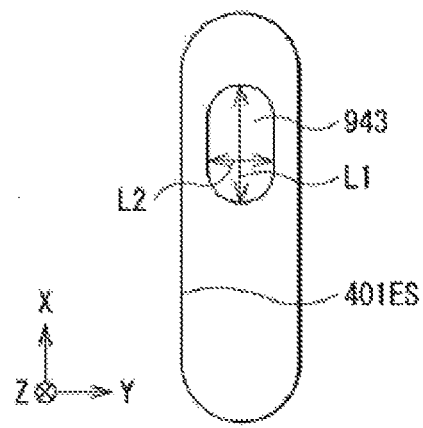
FIG. 21B is another plan view illustrating the main portion of the positioning mechanism according to Modification Example 3 of the disclosure.

Next, a configuration of a positioning mechanism 7E as Modification Example 3, which can be applied to the ink jet head 4 instead of the positioning mechanism 7A described in the embodiment will be described in detail with reference to FIGS. 19 to 21B. FIG. 19 is an enlarged perspective view illustrating the positioning mechanism 7E and the vicinity thereof in a state where the ink jet head 4 (base plate 401) is mounted on the pedestal 62a of the carriage 62. FIGS. 20A and 20B are sectional views corresponding to FIG. 19. FIGS. 21A and 21B are plan views corresponding to FIGS. 20A and 20B, respectively.

As illustrated in FIGS. 19 to 20B, the positioning mechanism 7E includes a rotating body 91, a rotating body 92, a positioning member 93, and an intermediate member 94. The positioning member 93 and the intermediate member 94 are interposed between the rotating body 91 and the rotating body 92 in the Y-axis direction. A hole H401E including an inner surface H401ES is provided at a position corresponding to the hole H62A, in the base plate 401. Here, the rotating body 91 is a specific example corresponding to "a first rotating body" of the disclosure. The rotating body 92 is a specific example corresponding to "a second rotating body" of the disclosure. The positioning member 93 is a specific example corresponding to "the first positioning member" of the disclosure. The intermediate member 94 is a specific example corresponding to "the first intermediate member" of the disclosure. The inner surface H401ES is a specific example corresponding to "the second inner surface" of the disclosure. The hole H401E is a specific example corresponding to "the second positioning hole" of the disclosure.

The rotating body 91 and the rotating body 92 are, for example, screws. The rotating body 91 and the rotating body 92 are capable of moving in the Z-axis direction while rotating with a rotation axis J91 and a rotation axis J92 as centers, respectively. The rotating bodies 91 and 92 include shaft portions 911 and 921 and head portions 912 and 922, respectively. Screw threads are formed on the outer circumferential surface of each of the shaft portions 911 and 921. The head portions 912 and 922 are attached to the upper ends of the shaft portions 911 and 921, respectively. The outer diameter of the head portions 912 and 922 is greater than the outer diameter of the shaft portions 911 and 921. Here, the head portion 912 and the head portion 922 are specific examples corresponding to "a first protrusion portion" and "a second protrusion portion" of the disclosure, respectively.

The intermediate member 94 includes a shaft portion 941 in which a slit is provided, and a head portion 942 attached to the upper end of the shaft portion 941. The intermediate member 94 is provided to be rotatable with a rotation axis J94 as the center. The head portion 942 includes an outer circumferential surface 942S inclined from the rotation axis J94. The shaft portion 941 of the intermediate member 94 passes through the hole H401E of the base plate 401, and then is inserted into the hole H62A in the pedestal 62a of the carriage 62. The shaft portion 941 of the intermediate member 94 is a specific example of "the first expansion portion" of the disclosure. A hole H94 penetrating in the Z-axis direction is provided in the intermediate member 94. The positioning member 93 is set to be inserted into the hole H94. The dimensions of the shaft portion 941 in the radial direction increase if the positioning member 93 is inserted into the hole H94. As a result, the shaft portion 941 abuts on the inner surface H62AS of the hole H62A in the pedestal 62a of the carriage 62.

In the intermediate member 94, a connection portion of the shaft portion 941 with the head portion 942 is set to be a flat portion 943. As illustrated in FIGS. 21A and 21B, the flat portion 943 has the minimum dimension L2 and the maximum dimension L1 in a horizontal section (XY section) orthogonal to the Z-axis direction. The minimum dimension L2 is smaller than the inner diameter of the hole H401E in the base plate 401. The maximum dimension L1 is equal to or greater than the inner diameter of the hole H401E. The intermediate member 94 may obtain states as follows by rotating with the rotation axis J94 as the center. The states are, for example, a state where the outer edge of the flat portion 943 abuts on the inner surface H401ES of the hole H401E as illustrated in FIG. 21A, and a state where the outer edge of the flat portion 943 is separate from the inner surface H401ES of the hole H401E as illustrated in FIG. 21B.

The rotating body 91, the rotating body 92, and the intermediate member 94 are disposed to cause outer edges of the head portions 912 and 922 in the rotating bodies 91 and 92 to respectively abut on the outer circumferential surface 942S of the head portion 942 in the intermediate member 94. The shaft portions 911 and 921 in the rotating bodies 91 and 92 screw to screw holes provided in the base plate 401. Here, in a case where the center position (reference position) of the hole H401E is slightly shifted from the center position (reference position) of the hole H62A, it is possible to align the intermediate member 94 in the Y-axis direction by using the rotating body 91 and the rotating body 92, in the positioning mechanism 7E. Specifically, firstly, as illustrated in FIG. 21B, the intermediate member 94 is rotated, and thus a state where the outer edge of the flat portion 943 is separate from the inner surface 401ES of the hole H401E is made. In this state, for example, if the rotating body 91 is rotated rightward so as to move the head portion 912 in the +Z direction and the rotating body 92 is rotated leftward so as to move the head portion 922 in the −Z direction, the head portion 942 including the outer circumferential surface 942S abutting on the head portions 912 and 922 is biased in a +Y direction, and the intermediate member 94 moves in the +Y direction. On the other hand, if the rotating body 91 is rotated leftward so as to move the head portion 912 in the −Z direction and the rotating body 92 is rotated rightward so as to move the head portion 922 in the +Z direction, the intermediate member 94 moves in the −Y direction.

As described above, according to the positioning mechanism 7E in Modification Example 3, it is possible to adjust the position of the intermediate member 94 by appropriately selecting the rotation direction and the amount of rotation (rotation angle) of the rotating body 91 and the rotating body 92. In the positioning mechanism 7E in Modification Example 3, the two rotating bodies 91 and 92 are used. However, in a case where an adjustment direction may be only any one of the +Y direction and the −Y direction, only any one of the rotating bodies 91 and 92 may be used. It is possible to adjust the position of the intermediate member 94 in both the +Y direction and the −Y direction, by using the two rotating bodies 91 and 92. In the positioning mechanism 7E in Modification Example 3, the intermediate member 94 includes the outer circumferential surface 942S which is inclined and abuts on the head portions 912 and 922 of the rotating bodies 91 and 92 and includes the flat portion 943. Therefore, it is possible to finely adjust the position of the intermediate member 94 by using the rotating bodies 91 and 92 in a manner that the intermediate member 94 changes the posture of the intermediate member 94, that is, performs switching from the posture in which the outer edge of the flat portion 943 is in contact with the inner surface 401ES to a state of being separate from the inner surface 401ES.

Modification Example 4

Figure 22A:
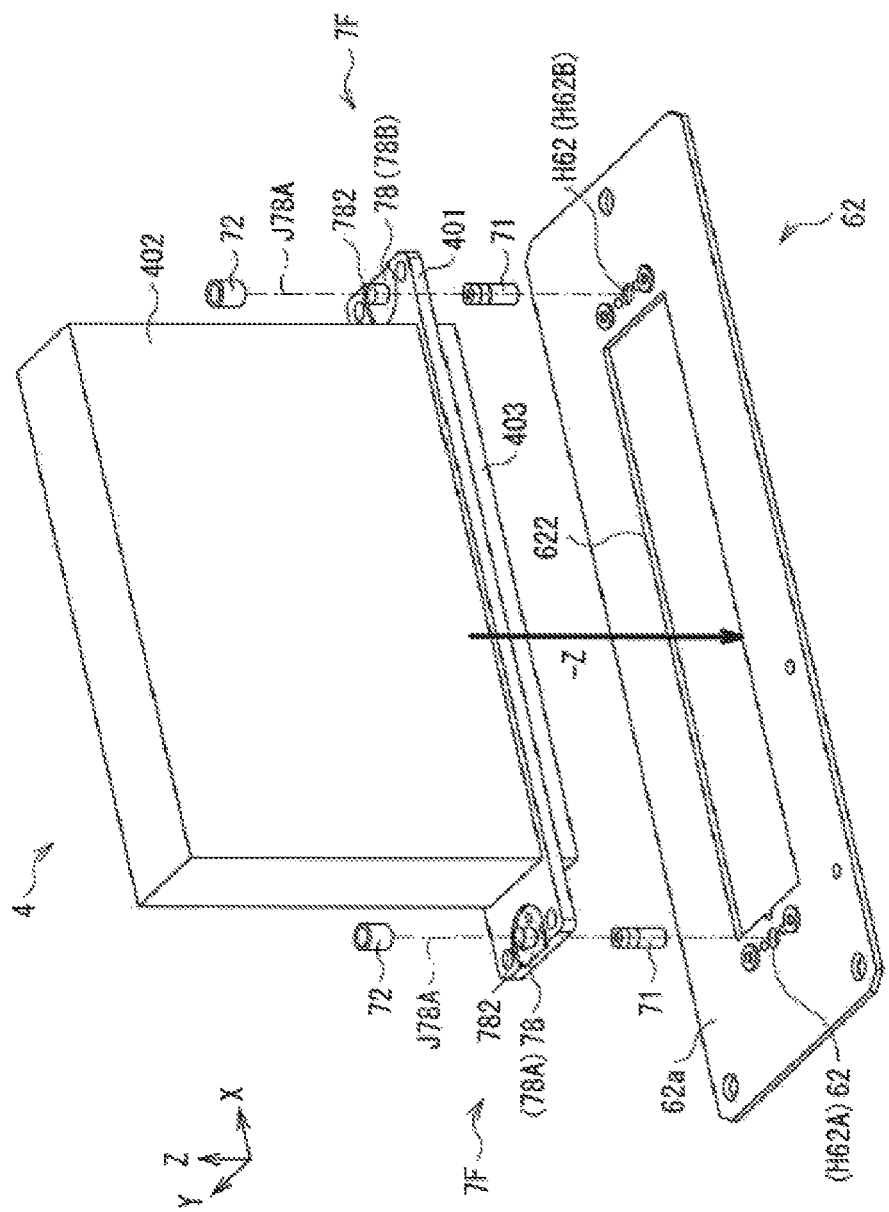
FIG. 22A is an exploded perspective view illustrating a liquid ejecting head including a positioning mechanism according to Modification Example 4 of the disclosure.
Figure 22B:
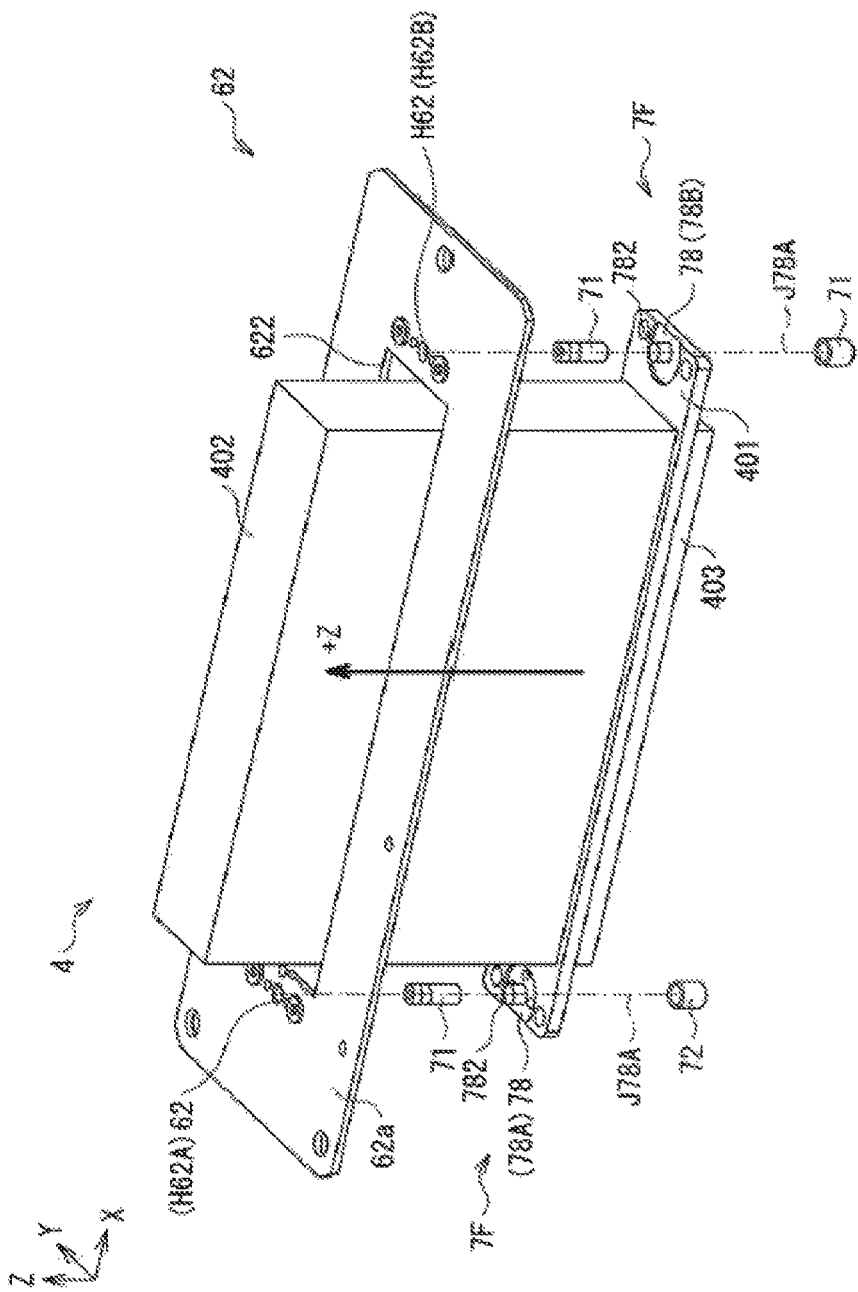
FIG. 22B is another exploded perspective view illustrating the liquid ejecting head including the positioning mechanism according to Modification Example 4 of the disclosure.
Figure 23A:
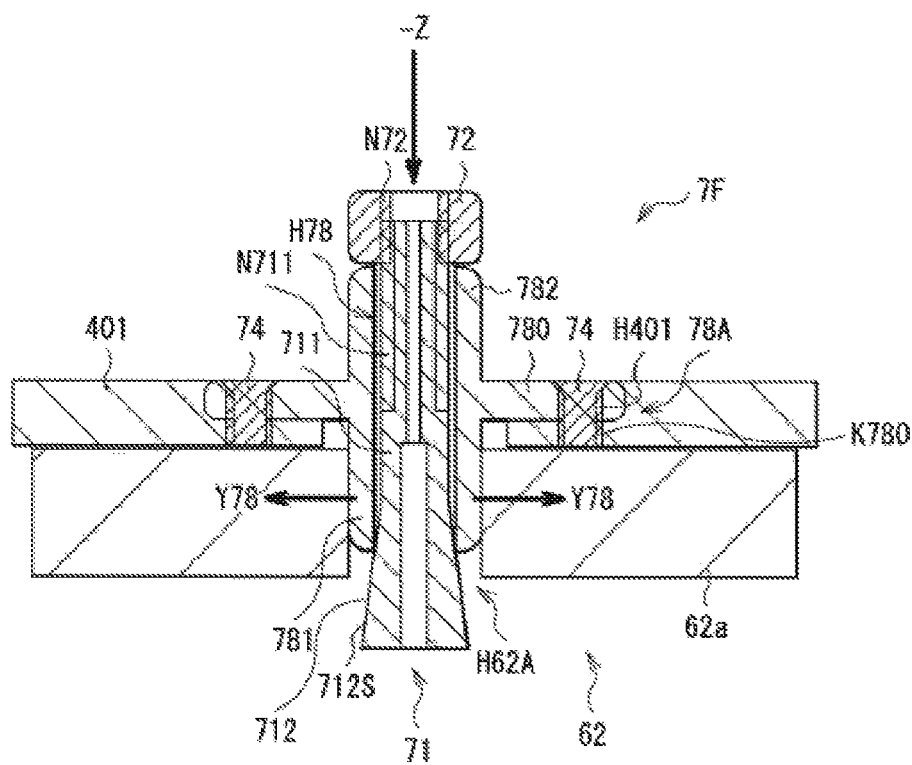
FIG. 23A is an enlarged sectional view illustrating the positioning mechanism according to Modification Example 4 of the disclosure.
Figure 23B:
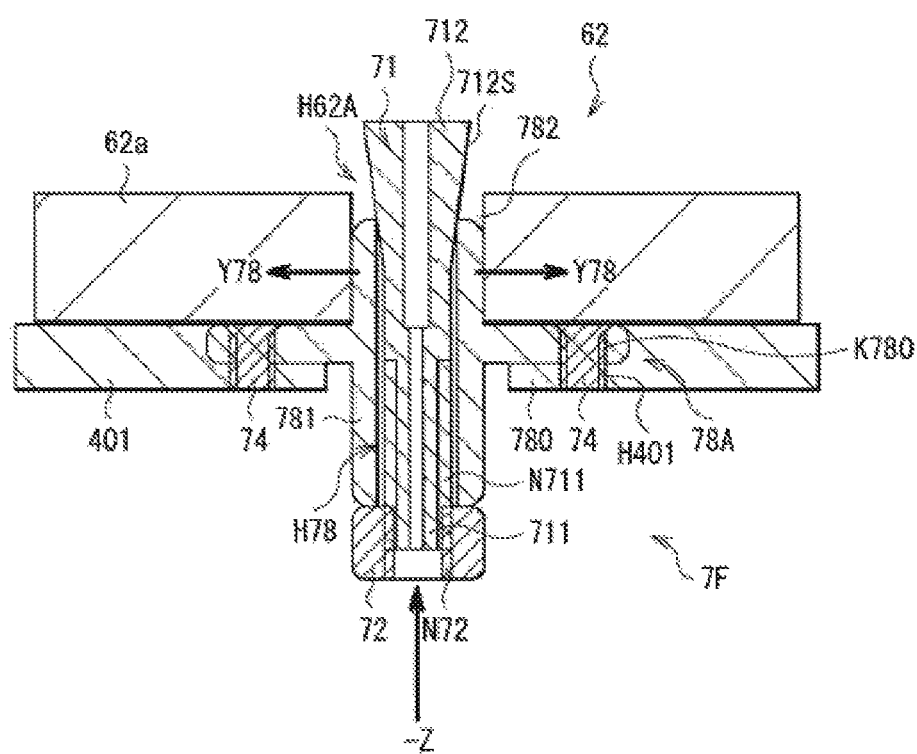
FIG. 23B is another enlarged sectional view illustrating the positioning mechanism according to Modification Example 4 of the disclosure.

Next, a configuration of a positioning mechanism 7F as Modification Example 4, which can be applied to the ink jet head 4 described in the embodiment will be described in detail with reference to FIGS. 22A to 23B. FIG. 22A is an enlarged exploded perspective view illustrating the ink jet head 4 and the vicinity thereof in a case where the ink jet head 4 (base plate 401) is mounted on the pedestal 62a of the carriage 62 from the upper portion of the pedestal 62a of the carriage 62. FIG. 22B is an enlarged exploded perspective view illustrating the ink jet head 4 and the vicinity thereof in a case where the ink jet head 4 (base plate 401) is mounted on the pedestal 62a of the carriage 62 from the lower portion of the pedestal 62a of the carriage 62. FIG. 23A corresponds to FIG. 22A. FIG. 23A is an enlarged sectional view illustrating the positioning mechanism 7F and the vicinity thereof in a state where the ink jet head 4 (base plate 401) is mounted on the pedestal 62a of the carriage 62 from the upper portion of the pedestal 62a of the carriage 62. FIG. 23B corresponds to FIG. 22B. FIG. 23B is an enlarged sectional view illustrating the positioning mechanism 7F and the vicinity thereof in a state where the ink jet head 4 (base plate 401) is mounted on the pedestal 62a of the carriage 62 from the lower portion of the pedestal 62a of the carriage 62.

The positioning mechanism 7F in Modification Example 4 is different from the positioning mechanism 7A in the embodiment in that the positioning mechanism 7F includes an intermediate member 78 instead of the intermediate member 73. Thus, in the following descriptions, the same components as those of the positioning mechanism 7A in the embodiment are denoted by the same reference signs, and descriptions thereof will be appropriately omitted. In Modification Example 4, the positioning mechanism 7F is provided at positions which respectively correspond to the hole H62A and the hole H62B in the pedestal 62a of the carriage 62. However, the positioning mechanism 7F has substantially the same configuration in any case. Thus, in the following descriptions, the positioning mechanism 7F corresponding to the hole H62A will be described. As illustrated in FIGS. 23A and 23B, the intermediate member 78 includes a base portion 780 as the base portion, a protrusion portion 781, and a protrusion portion 782. The base portion 780 has a flat plate shape. The protrusion portion 781 and the protrusion portion 782 protrude from the base portion 780 in directions which are opposite to each other in the Z-axis direction.

The intermediate member 78 may be made of a material which is elastically deformed easier than that of the base plate 401 or the carriage 62, for example. A hole H78 as the first insertion hole, which passes through the protrusion portion 781, the base portion 780, and the protrusion portion 782 is provided in the intermediate member 78. A plurality of screw holes K780 is provided in the base portion 780 of the intermediate member 78. Here, the intermediate member 78, the protrusion portion 781, and the protrusion portion 782 are specific examples corresponding to "the first intermediate member", "the first expansion portion", and "the second expansion portion" of the disclosure, respectively. The hole H78 of the intermediate member 73 is a specific example corresponding to "the first insertion hole" of the disclosure.

The hole H401 which penetrates the base plate 401 in the Z-axis direction is provided at a position corresponding to the screw hole K780 of the intermediate member 78 in the Z-axis direction, in the base plate 401. That is, a portion of the base portion 780 overlaps a portion of the base plate 401 so as to cause the screw hole K780 of the base portion 780 of the intermediate member 78 to communicate with the hole H401 of the base plate 401 in the Z-axis direction. If the screw 74 passes through the hole H401, and screws to the screw hole K780, the base plate 401 and the base portion 780 of the intermediate member 78 are fastened to each other.

If the positioning member 71 is inserted into the hole H78, the protrusion portion 781 of the intermediate member 78 deforms (for example, elastically deforms) to expand in a radial direction Y78 (see FIG. 23A) intersecting with the insertion direction of the positioning member (−Z direction). As illustrated in FIG. 23A, the protrusion portion 781 inserted into the hole H62A in the pedestal 62a of the carriage 62 in the −Z direction deforms in this manner and thus can abut on the inner surface H62AS of the hole H62A in the pedestal 62a of the carriage 62.

Similarly, the protrusion portion 782 of the intermediate member 78 deforms (for example, elastically deforms) to expand in the radial direction Y78 (see FIG. 23B) intersecting with the insertion direction (+Z direction) thereof, if the positioning member 71 is inserted into the hole H78. As illustrated in FIG. 23B, the protrusion portion 782 inserted into the hole H62A in the pedestal 62a of the carriage 62 in the +Z direction deforms in this manner and thus can abut on the inner surface H62AS of the hole H62A in the pedestal 62a of the carriage 62.

Similar to the positioning mechanism 7A in the embodiment, the positioning mechanism 7F in Modification Example 4 includes the hole H72 communicating with the hole H78, and further includes the positioning member 72 provided to be capable of screwing to the positioning member 71. If the positioning member 71 passes through the hole H78 and is inserted into the hole H72 so as to screw to the positioning member 72, the protrusion portion 782 expands in the radial direction Y78.

As described above, in the positioning mechanism 7F in Modification Example 4, both the protrusion portion 781 and the protrusion portion 782 which protrude in the direction opposite to each other can be selectively inserted into the hole H62A of the carriage 62. The protrusion portion 781 or the protrusion portion 782 can abut on the inner surface H62AS by expanding in the radial direction Y78. Therefore, it is possible to mount the ink jet head 4 in the carriage 62 in both the +Z direction and the −Z direction.

Modification Example 5

Figure 24A:
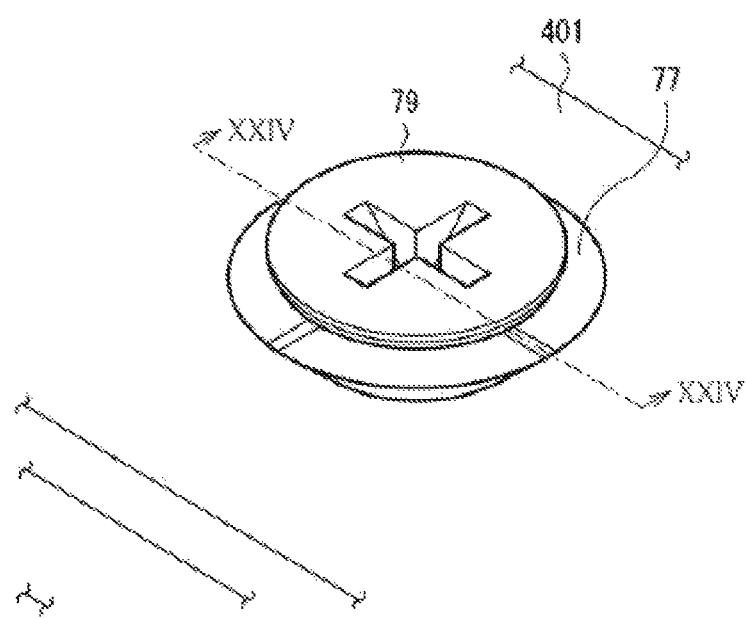
FIG. 24A is an enlarged sectional view illustrating a positioning mechanism according to Modification Example 5 of the disclosure.
Figure 24B:
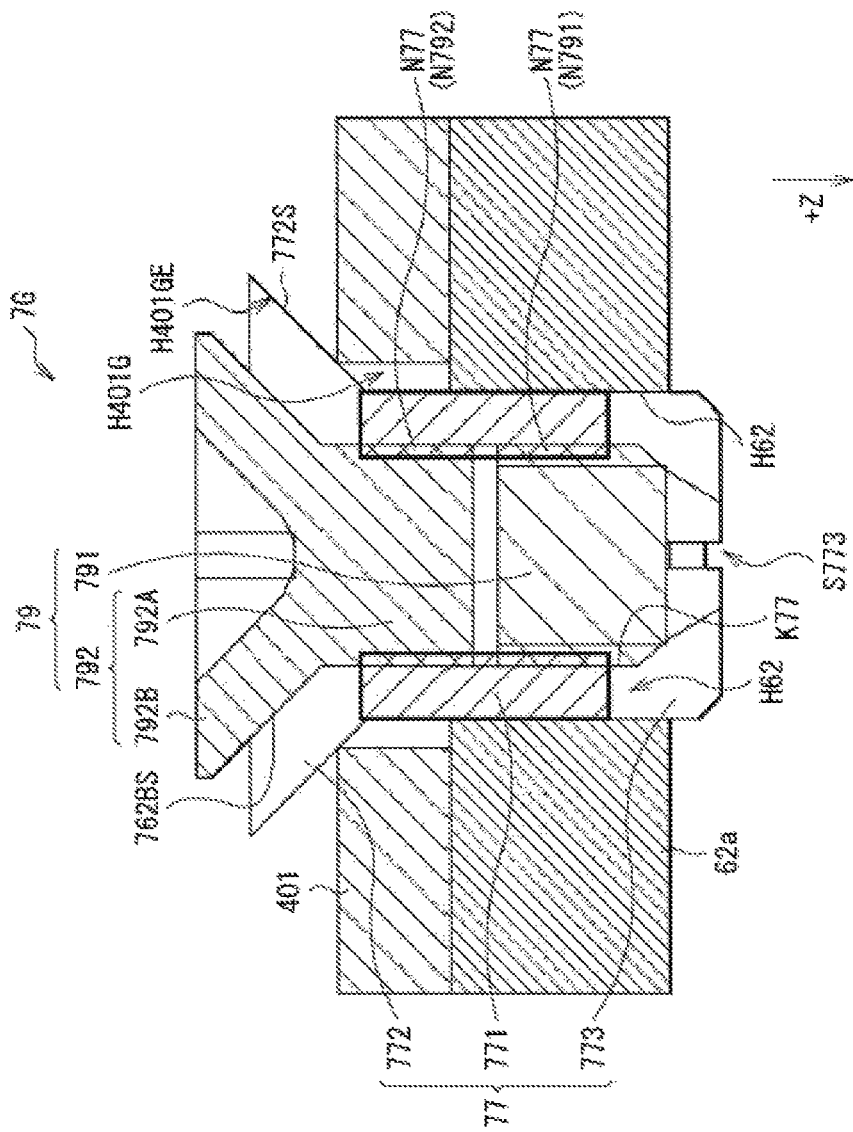
FIG. 24B is an enlarged sectional view illustrating the positioning mechanism according to Modification Example 5 of the disclosure.

Next, a configuration of a positioning mechanism 7G as Modification Example 5, which can be applied to the ink jet head 4 described in the embodiment will be described in detail with reference to FIGS. 24A and 24B. FIGS. 24A and 24B are an enlarged perspective view and an enlarged sectional view illustrating the positioning mechanism 7G and the vicinity thereof in a state where the ink jet head 4 (base plate 401) is mounted on the pedestal 62a of the carriage 62. FIG. 24B illustrates a section in a direction indicated by an arrow along line XXIV-XXIV illustrated in FIG. 24A.

The positioning mechanism 7G in Modification Example 5 is different from the positioning mechanism 7D in Modification Example 3 in that the positioning mechanism 7G includes a positioning member 79 instead of the positioning member 76.

Thus, in the following descriptions, the same components as those of the positioning mechanism 7D in Modification Example 3 are denoted by the same reference signs, and descriptions thereof will be appropriately omitted.

In the positioning mechanism 7G in Modification Example 5, a hole H401G which is a space defined by an inner surface extending in the Z-axis direction is provided in the base plate 401. The hole H401G of the base plate 401 is provided at a position corresponding to the hole H62 in the Z-axis direction. The inner diameter of the hole H401G in the base plate 401 is greater than the inner diameter of the hole H62 in the pedestal 62a of the carriage 62. An end edge H401GE of the inner surface forming the hole H401G, on an opposite side of the pedestal 62a of the carriage 62 is configured to be capable of abutting on an inclined surface S772 of the inclined portion 772 of the intermediate member 77.

The positioning member 79 includes a lower positioning member 791 and an upper positioning member 792. The lower positioning member 791 and the upper positioning member 792 are set to be inserted into the hole H77 in this order. The lower positioning member 791 is a screw member having an outer circumferential surface on which screw threads N791 are formed. The lower positioning member 791 is movable along the Z axis by the screw threads N791 screwing to the screw threads N77 provided in the hole H77. The lower positioning member 791 has an outer diameter which is slightly greater than the inner diameter of the hole H77 in the main body portion 771. The upper positioning member 792 is a screw member having an outer circumferential surface on which screw threads N792 are formed. The upper positioning member 792 includes a shaft portion 792A extending in the Z-axis direction and a head portion 792B having dimensions in the radial direction, which increase as becoming separate from the shaft portion 792A in the Z-axis direction. The shaft portion 792A has an outer diameter which is slightly greater than the inner diameter of the hole H77 in the main body portion 771. The head portion 792B includes an inclined surface 792BS inclined along the inclined portion 772. The upper positioning member 792 is movable along the Z axis by the screw threads N792 screwing to the screw threads N77 provided in the hole H77.

Here, the positioning member 79 is a specific example corresponding to "the first positioning member" of the disclosure. The hole H401G is a specific example corresponding to "the second positioning hole" of the disclosure.

In the positioning mechanism 7G in Modification Example 5, the main body portion 771 passes through the hole H401G and is inserted into the hole H62. The lower positioning member 791 and the upper positioning member 792 are inserted into the hole H77 in this order, in a state where the inclined surface S772 of the inclined portion 772 of the intermediate member 77 abuts on the end edge H401GE of the hole H401G in the base plate 401. Firstly, since the lower positioning member 791 is inserted into the hole H77 and is fastened, the lower positioning member 791 moves in the +Z direction and abuts on an inner surface of the tip end portion 773 of the intermediate member 77, at which the slits S773 are provided. Thus, the tip end portion 773 of the intermediate member 77 and the main body portion 771 are pressed on the lower positioning member 791, and deform (for example, elastically deform) to expand in the radial direction intersecting with the insertion direction thereof (+Z direction). As a result, the outer circumferential surface of the main body portion 771 of the expanded intermediate member 77 and the outer circumferential surface of the tip end portion 773 abut on the inner surface H62S of the hole H62 in the pedestal 62a of the carriage 62. Then, the upper positioning member 792 is inserted into the hole H77 and is fastened. Thus, the upper positioning member 792 moves in the +Z direction, and the inclined surface 792BS of the head portion 792B of the upper positioning member 792 abuts on the inclined portion 772 of the intermediate member 77. As a result, the inclined surface S772 of the inclined portion 772 of the intermediate member 77 abuts on the end edge H401GE of the hole H401G in the base plate 401. Thus, aligning between the hole H62 in the pedestal 62a of the carriage 62 and the hole H401G of the base plate 401 is performed.

As described above, in the positioning mechanism 7G in Modification Example 5, it is also possible to perform aligning between the hole H62 in the pedestal 62a of the carriage 62 and the hole H401G of the base plate 401, by using the intermediate member 77 and the positioning member 79. As a result, it is possible to easily perform aligning between the pedestal 62a of the carriage 62 and the base plate 401 of the ink jet head 4.

3. OTHER MODIFICATION EXAMPLES

Hitherto, the disclosure is described by exemplifying the embodiment and the modification examples. However, the disclosure is not limited to the embodiment and the like, and various modifications can be made.

For example, in the embodiment and the like, descriptions are made by specifically describing the configuration example (shape, disposition, number of pieces, and the like) of the members in the printer, the ink jet head, and the head chip. However, the configuration example is not limited to the descriptions of the embodiment and the like, and another shape, disposition, number of pieces, and the like may be provided. For example, the intermediate member is not limited to the descriptions in the embodiment and the like. For example, an intermediate member made of an annular elastic member such as a rubber ring, for example, may be provided.

In the embodiment, the plurality of slits S73 extending in a protrusion direction (Z-axis direction) of the protrusion portion 731 and the protrusion portion 732 is provided in the protrusion portion 731 and the protrusion portion 732 of the intermediate member 73. However, the disclosure is not limited thereto. The protrusion portion 731 and the protrusion portion 732 of the intermediate member 73 may not include the slits S73.

In the embodiment, a case where the positioning mechanism 7A is provided at the position corresponding to the hole H62A and the positioning mechanism 7B is provided at the position corresponding to the hole H62B, in the pedestal 62a of the carriage 62 is described. However, the disclosure is not limited thereto. That is, any of the positioning mechanisms 7A to 7G described in Modification Examples 1 to 5 may be provided at one of the positions corresponding to the hole H62A and the hole H62B. Any combination of the positioning mechanisms 7A to 7G to be employed may be provided. Even in any case, it is possible to improve installation position accuracy of the ink jet head 4 for the carriage 62, and to stably perform the recording operation. As a result, it is possible to secure high reliability. The positioning members 71, 81, 75, 76, and 79 in the positioning mechanisms 7A to 7D, 7F, and 7G may be specific examples corresponding to "the third positioning member" of the disclosure.

Figure 25A:
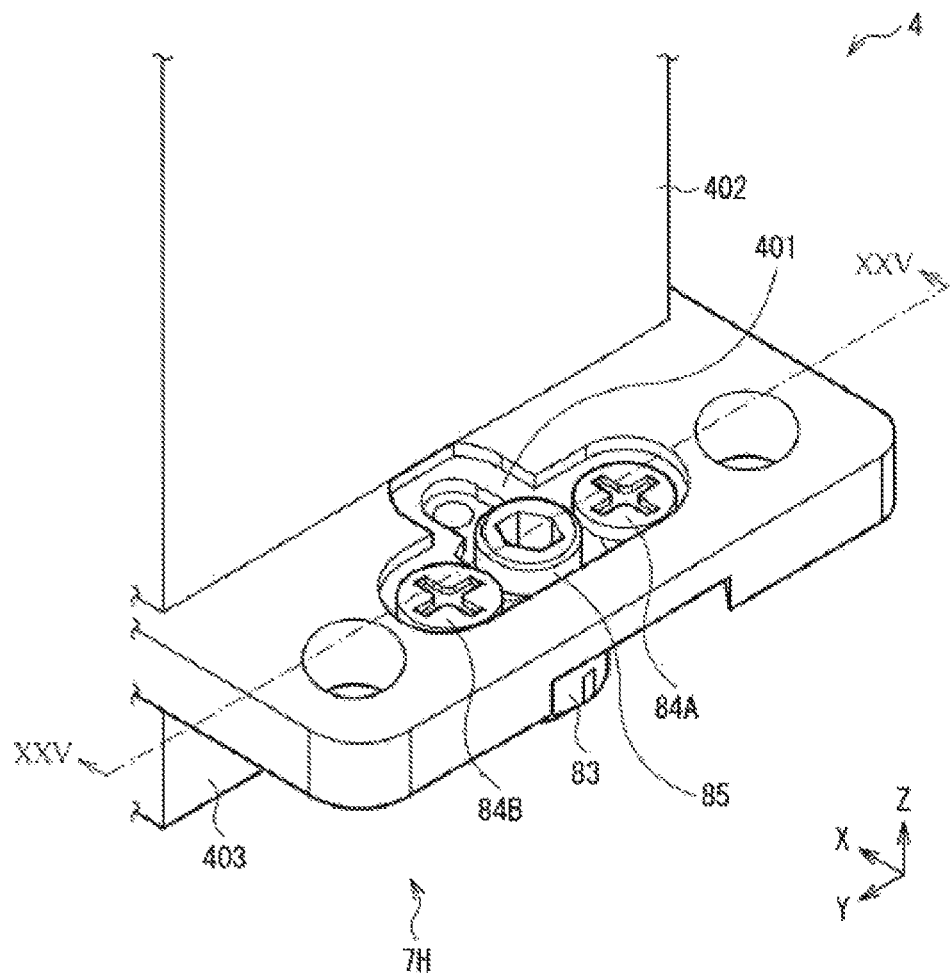
FIG. 25A is an enlarged perspective view illustrating a positioning mechanism according to Modification Example 6 of the disclosure.
Figure 25B:
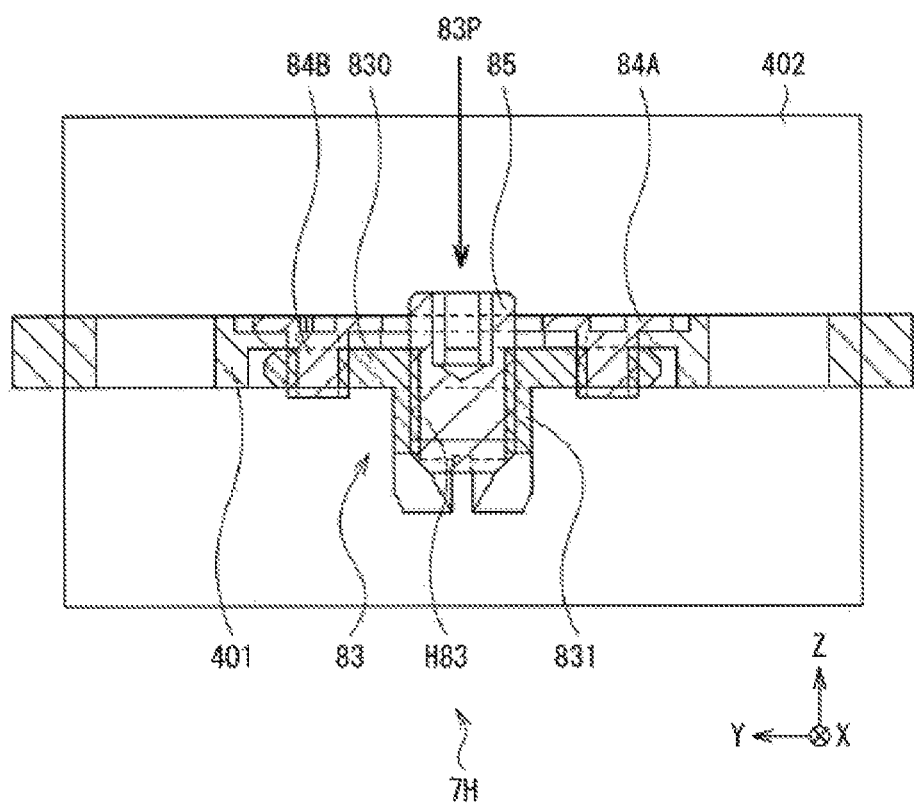
FIG. 25B is an enlarged sectional view illustrating the positioning mechanism according to Modification Example 6 of the disclosure.

In the embodiment, a case where the intermediate member 73 and the like are provided to be separate from the base plate 401 is described as an example. However, the disclosure is not limited thereto. For example, as with the positioning mechanism 7H as Modification Example 6, which is illustrated in FIGS. 25A and 25B, the intermediate member 83 and the base plate 401 may be integrated by fastening the intermediate member 83 to the base plate 401 with a pair of intermediate member set screws 84A and 84B. The intermediate member 83 is attached to an attachment position P83 of the base plate 401, in advance. The attachment position P83 is a position which is spaced from the reference position of the ink jet head 4 (for example, the position of one nozzle selected from the plurality of nozzles H1 and H2) at a predetermined distance in the X-Y plane. FIGS. 25A and 25B are an enlarged perspective view and an enlarged sectional view illustrating the positioning mechanism 7H and the vicinity thereof in a state where the ink jet head 4 (base plate 401) is mounted on the pedestal 62a of the carriage 62. In FIGS. 25A and 25B, the illustration of the carriage 62(pedestal 62a) is omitted. FIG. 25B illustrates a section in a direction indicated by an arrow along XXV-XXV line illustrated in FIG. 25A. The intermediate member 83 includes a base portion 830, a protrusion portion 831 and a hole H83. The protrusion portion 831 protrudes downward from the base portion 830 (in the −Z direction). The hole H83 penetrates the base portion 830 and the protrusion portion 831. The positioning mechanism 7H further includes a positioning member 85 inserted into the hole H83. If the positioning member 85 is inserted into the hole H83, the protrusion portion 831 of the intermediate member 83 deforms (for example, elastically deforms) to expand in the radial direction intersecting with the insertion direction thereof (−Z direction). The protrusion portion 831 inserted into the hole H62A or the hole H62B in the pedestal 62a of the carriage 62 deforms in this manner and thus can abut on the inner surface of the hole H62A or the hole H62B in the pedestal 62a of the carriage 62. As described above, in Modification Example 6, since the intermediate member 83 is attached to the attachment position P83 in the base plate 401 in advance, it is possible to avoid position shift between the intermediate member 83 and the base plate 401 at a state where the ink jet head 4 is mounted on the pedestal 62a of the carriage 62. In Modification Example 6, the intermediate member 83 and the base plate 401 are integrated by fastening the intermediate member 83 to the base plate 401 with the pair of intermediate member set screws 84A and 84B. However, the intermediate member 83 and the base plate 401 may be welded. Alternatively, an article in which the intermediate member 83 and the base plate 401 are integrally molded may be used.

In the embodiment and the like, the printer (ink jet printer) 1 is described as a specific example of "the liquid ejecting recording apparatus" in the disclosure. However, it is not limited thereto. The disclosure can be also applied to devices other than the ink jet printer. In other words, "the liquid ejecting head" (ink jet head 4) in the disclosure may be applied to a device other than the ink jet printer. Specifically, for example, "the liquid ejecting head" in the disclosure may be applied to a device such as a facsimile machine or an on-demand printing machine.

The effects described in this specification are just an example, and it is not limited thereto. In addition, other effects may be obtained.

The disclosure may have a configuration as follows.
<1>
A liquid ejecting head being mounted on a carriage in which a first positioning hole defined by a first inner surface is provided, the head including:
a first positioning member, and
a first intermediate member including a first expansion portion being capable of being inserted into the first positioning hole and abutting on the first inner surface by expanding in a radial direction intersecting with an insertion direction of the first expansion portion,
in which
the first expansion portion includes a first insertion hole into which the first positioning member is inserted and expands in the radial direction by the first positioning member being inserted into the first insertion hole.
<2>
The liquid ejecting head described in <1>,
in which dimensions of the first expansion portion in the radial direction increase with the first positioning member moving to the first expansion portion in the insertion direction.
<3>
The liquid ejecting head described in <2>,
in which the first positioning member includes a shaft portion on which screw threads are formed and a tapered portion having dimensions in the radial direction, which increase as becoming farther from the shaft portion in the insertion direction.
<4>
The liquid ejecting head described in any one of <1> from <3>,
in which Conditional Expression (1) is satisfied.

$$\phi B1 < \phi A \leq \phi B2 \tag{1}$$

where,
φA: inner diameter of the first positioning hole
φB1: outer diameter of the contracted first expansion portion
φB2: outer diameter of the expanded first expansion portion
<5>
The liquid ejecting head described in <1> or <2> further including:
a base plate in which a second positioning hole defined by a second inner surface is provided at a position corresponding to the first positioning hole,
in which the first expansion portion is capable of passing through the second positioning hole and being inserted into the first positioning hole.
<6>
The liquid ejecting head described in <1> or <2>, the head further including:
a base plate having an attachment position being at a predetermined distance from a reference position of the liquid ejecting head,
in which the first intermediate member is attached to the base plate at the attachment position in advance.
<7>
The liquid ejecting head described in any one of <1> to <4>, the head further including:
a base plate in which a second positioning hole defined by a second inner surface is provided at a position corresponding to the first positioning hole, and
a second positioning member including a second insertion hole communicating with the first insertion hole, and being provided to be capable of being screwed to the first positioning member,
in which the first intermediate member further includes a second expansion portion being capable of being inserted to the second positioning hole in an opposite direction of the insertion direction and abutting on the second inner surface by expanding in the radial direction, and
the second expansion portion expands in the radial direction by the first positioning member passing through the first insertion hole and being inserted into the second insertion hole so as to be screwed to the second positioning member.

<8>
The liquid ejecting head described in any one of <1> to <4>, the head further including:
a base plate including a second positioning hole defined by an edge portion,
in which the first intermediate member further includes a first inclined portion having dimensions in the radial direction, which increase as becoming farther from the first expansion portion,
the first expansion portion is capable of passing through the second positioning hole and being inserted into the first positioning hole, and
the first inclined portion abuts on the edge portion of the second positioning hole.

<9>
The liquid ejecting head described in <8>,
in which the edge portion includes an inclined surface inclined to correspond to the first inclined portion.

<10>
The liquid ejecting head described in any one of <1> to <4>,
in which the first intermediate member further includes a base portion and a second expansion portion protruding from the base portion toward an opposite side of the first expansion portion and passing through the first insertion hole, and
the second expansion portion is capable of being inserted into the first positioning hole and abutting on the first inner surface by the first positioning member being inserted into the first insertion hole so as to expand in the radial direction.

<11>
The liquid ejecting head described in <10>, the head further including:
a second positioning member including a second insertion hole communicating with the first insertion hole and being provided to be capable of being screwed to the first positioning member,
in which the second expansion portion expands in the radial direction by the first positioning member passing through the first insertion hole and being inserted into the second insertion hole so as to be screwed to the second positioning member.

<12>
The liquid ejecting head described in any one of <1> to <4>, the head further including
a third positioning member, and
a second intermediate member including a third insertion hole into which the third positioning member is inserted, and including a third expansion portion expanding in the radial direction by the third positioning member being inserted into the third insertion hole,
in which the carriage further includes a first auxiliary hole being provided at a position different from the first positioning hole and including a third inner surface, and
the third expansion portion is capable of being inserted into the first auxiliary hole and abutting on the third inner surface by expanding in the radial direction.

<13>
The liquid ejecting head described in <12>, the head further including:
a base plate in which a second positioning hole is provided at a position corresponding to the first positioning hole and a second auxiliary hole is provided at a position corresponding to the first auxiliary hole,
in which the second auxiliary hole is a long hole having a major axis and a minor axis, and the second positioning hole is provided on a line of extending the major axis.

<14>
The liquid ejecting head described in <5>, the head further including:
a first rotating body including a first protrusion portion moving in the insertion direction or an opposite direction of the insertion direction while rotating about a first rotation axis along the insertion direction,
in which the first intermediate member or the first positioning member further includes an inclined surface being inclined from the first rotation axis and abutting on the first protrusion portion.

<15>
The liquid ejecting head described in <14>, the head further including:
a second rotating body including a second protrusion portion moving in the insertion direction or the opposite direction of the insertion direction while rotating about a second rotation axis along the insertion direction and abutting on the inclined surface,
in which the second rotating body is positioned on an opposite side of the first rotating body when viewed from the first intermediate member or the first positioning member.

<16>
The liquid ejecting head described in <14> or <15>,
in which the first intermediate member includes a flat portion in a horizontal section orthogonal to the insertion direction, the flat portion having the minimum dimension smaller than an inner diameter of the second positioning hole and the maximum dimension being equal to or greater than the inner diameter of the second positioning hole.

<17>
A liquid ejecting recording apparatus including:
the liquid ejecting head described in any one of <1> to <16>, and
the carriage in which the liquid ejecting head is mounted.

What is claimed is:

1. A liquid ejecting head being mounted on a carriage in which a first positioning hole defined by a first inner surface is provided, the head comprising:
a first positioning member; and
a first intermediate member including a first expansion portion being capable of being inserted into the first positioning hole and abutting on the first inner surface by expanding in a radial direction intersecting with an insertion direction of the first expansion portion,
wherein the first expansion portion includes a first insertion hole into which the first positioning member is inserted and expands in the radial direction by the first positioning member being inserted into the first insertion hole.

2. The liquid ejecting head according to claim 1,
wherein dimensions of the first expansion portion in the radial direction increase with the first positioning member moving to the first expansion portion in the insertion direction.

3. The liquid ejecting head according to claim 2,
wherein the first positioning member includes a shaft portion on which screw threads are formed and a tapered portion having dimensions in the radial direction, which increase as becoming farther from the shaft portion in the insertion direction.

4. The liquid ejecting head according to claim 1,
wherein Conditional Expression (1) is satisfied $$\phi B1 < \phi A \leq \phi B2 \tag{1}$$

where,
φA: inner diameter of the first positioning hole
φB1: outer diameter of the contracted first expansion portion
φB2: outer diameter of first expansion portion at a time of expanding.

5. The liquid ejecting head according to claim 1, further comprising a base plate in which a second positioning hole defined by a second inner surface is provided at a position corresponding to the first positioning hole,
   wherein the first expansion portion is capable of passing through the second positioning hole and being inserted into the first positioning hole.

6. The liquid ejecting head according to claim 5, further comprising a first rotating body including a first protrusion portion moving in the insertion direction or an opposite direction of the insertion direction while rotating about a first rotation axis along the insertion direction,
   wherein the first intermediate member or the first positioning member further includes an inclined surface being inclined from the first rotation axis and abutting on the first protrusion portion.

7. The liquid ejecting head according to claim 6, further comprising a second rotating body including a second protrusion portion moving in the insertion direction or the opposite direction of the insertion direction while rotating about a second rotation axis along the insertion direction and abutting on the inclined surface,
   wherein the second rotating body is positioned on an opposite side of the first rotating body when viewed from the first intermediate member or the first positioning member.

8. The liquid ejecting head according to claim 6,
   wherein the first intermediate member includes a flat portion in a horizontal section orthogonal to the insertion direction, the flat portion having the minimum dimension smaller than an inner diameter of the second positioning hole and the maximum dimension being equal to or greater than the inner diameter of the second positioning hole.

9. The liquid ejecting head according to claim 1, further comprising a base plate having an attachment position being at a predetermined distance from a reference position of the liquid ejecting head,
   wherein the first intermediate member is attached to the base plate at the attachment position in advance.

10. The liquid ejecting head according to claim 1, further comprising:
   a base plate in which a second positioning hole defined by a second inner surface is provided at a position corresponding to the first positioning hole; and
   a second positioning member including a second insertion hole communicating with the first insertion hole, and being provided to be capable of being screwed to the first positioning member,
   wherein the first intermediate member further includes a second expansion portion being capable of being inserted to the second positioning hole in an opposite direction of the insertion direction and abutting on the second inner surface by expanding in the radial direction, and
   the second expansion portion expands in the radial direction by the first positioning member passing through the first insertion hole and being inserted into the second insertion hole so as to be screwed to the second positioning member.

11. The liquid ejecting head according to claim 1, further comprising a base plate including a second positioning hole defined by an edge portion,
   wherein the first intermediate member further includes a first inclined portion having dimensions in the radial direction, which increase as becoming farther from the first expansion portion,
   the first expansion portion is capable of passing through the second positioning hole and being inserted into the first positioning hole, and
   the first inclined portion abuts on the edge portion of the second positioning hole.

12. The liquid ejecting head according to claim 11,
   wherein the edge portion includes an inclined surface inclined to correspond to the first inclined portion.

13. The liquid ejecting head according to claim 1,
   wherein the first intermediate member further includes a base portion and a second expansion portion protruding from the base portion toward an opposite side of the first expansion portion and passing through the first insertion hole,
   the second expansion portion is capable of being inserted into the first positioning hole and abutting on the first inner surface by the first positioning member being inserted into the first insertion hole so as to expand in the radial direction.

14. The liquid ejecting head according to claim 13, further comprising a second positioning member including a second insertion hole communicating with the first insertion hole and being provided to be capable of being screwed to the first positioning member,
   wherein the second expansion portion expands in the radial direction by the first positioning member passing through the first insertion hole and being inserted into the second insertion hole so as to be screwed to the second positioning member.

15. The liquid ejecting head according to claim 1, further comprising:
   a third positioning member; and
   a second intermediate member including a third insertion hole into which the third positioning member is inserted, and including a third expansion portion expanding in the radial direction by the third positioning member being inserted into the third insertion hole,
   wherein the carriage further includes a first auxiliary hole being provided at a position different from the first positioning hole and including a third inner surface, and
   the third expansion portion is capable of being inserted into the first auxiliary hole and abutting on the third inner surface by expanding in the radial direction.

16. The liquid ejecting head according to claim 15, further comprising a base plate in which a second positioning hole is provided at a position corresponding to the first positioning hole and a second auxiliary hole is provided at a position corresponding to the first auxiliary hole,
   wherein the second auxiliary hole is a long hole having a major axis and a minor axis, and
   the second positioning hole is provided on a line of extending the major axis.

17. A liquid ejecting recording apparatus comprising:
   the liquid ejecting head according to claim 1; and
   the carriage in which the liquid ejecting head is mounted.

* * * * *